United States Patent
Holland et al.

(10) Patent No.: US 12,348,643 B2
(45) Date of Patent: Jul. 1, 2025

(54) EXTENDED REALITY CONTROL OF SMART DEVICES

(71) Applicant: QUALCOMM Incorporated, San Diego, CA (US)

(72) Inventors: Wesley James Holland, Encinitas, CA (US); Brian Vogelsang, San Diego, CA (US); Robert Tartz, San Marcos, CA (US); Martin Renschler, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 378 days.

(21) Appl. No.: 17/464,539

(22) Filed: Sep. 1, 2021

(65) Prior Publication Data

US 2023/0062244 A1    Mar. 2, 2023

(51) Int. Cl.
   *H04L 9/32*     (2006.01)
   *H04L 9/08*     (2006.01)
   *G16Y 10/75*    (2020.01)

(52) U.S. Cl.
   CPC .......... *H04L 9/3247* (2013.01); *H04L 9/0861* (2013.01); *H04L 9/3231* (2013.01); *G16Y 10/75* (2020.01)

(58) Field of Classification Search
   CPC . H04L 9/06; H04L 9/08; H04L 9/3247; H04L 9/0861; H04L 9/3231; G16Y 10/75
   (Continued)

(56) References Cited

U.S. PATENT DOCUMENTS 5,799,087 A * 8/1998 Rosen ............... G06Q 30/06
                                                 705/41
6,839,436 B1 * 1/2005 Garay ............... H04L 9/0891
                                                 380/278

(Continued)

FOREIGN PATENT DOCUMENTS

EP    1956535 A1 *  8/2008  .......... G06Q 10/107
EP    3823329 A1 *  5/2021  ............. H04L 12/66

(Continued)

OTHER PUBLICATIONS

Kumar, M. Guru Vimal, and U. S. Ragupathy. "A survey on current key issues and status in cryptography." In 2016 International Conference on Wireless Communications, Signal Processing and Networking (WISPNET), pp. 205-210. IEEE, 2016. (Year: 2016).*

(Continued)

*Primary Examiner* — Luu T Pham
*Assistant Examiner* — Walter J Malinowski
(74) *Attorney, Agent, or Firm* — Polsinelli/Qualcomm

(57) ABSTRACT

Systems, methods, and non-transitory media are provided for extended reality (XR) control of smart devices. An example method can include generating, by a first computing device, a cryptographic key; outputting, by the first computing device, a pattern that encodes the cryptographic key, the pattern including a visual pattern, an audio pattern, and/or a light pattern; receiving, by the first computing device from a second computing device, a signed message including a command to modify an operation of the first computing device; determining, by the first computing device, whether the signed message is signed with the cryptographic key encoded in the pattern; and based on a determination that the signed message is signed with the cryptographic key encoded in the pattern, modifying the (Continued)

operation of the first computing device according to the command in the signed message.

25 Claims, 9 Drawing Sheets

(58) Field of Classification Search
USPC .......................................................... 713/176
See application file for complete search history.

(56) References Cited

U.S. PATENT DOCUMENTS

| | | | |
|---|---|---|---|
| 7,007,303 B2* | 2/2006 | Goldberg | H04N 1/32144 382/292 |
| 2002/0016913 A1* | 2/2002 | Wheeler | H04L 9/3247 713/181 |
| 2007/0038857 A1* | 2/2007 | Gosnell | G06F 16/10 713/165 |
| 2007/0179907 A1* | 8/2007 | Waris | G06Q 20/3821 705/76 |
| 2012/0165614 A1* | 6/2012 | Strickland | G16H 40/40 600/300 |
| 2013/0223279 A1* | 8/2013 | Tinnakornsrisuphap | H04L 41/0809 370/254 |
| 2014/0013100 A1* | 1/2014 | Menzel | H04N 21/43637 455/414.1 |
| 2014/0152869 A1* | 6/2014 | Solotko | G06Q 10/10 348/231.3 |
| 2014/0325206 A1* | 10/2014 | Kim | H04L 9/0872 713/150 |
| 2017/0061272 A1* | 3/2017 | Deliwala | G06Q 20/36 |
| 2018/0314416 A1* | 11/2018 | Powderly | G06F 3/016 |
| 2020/0007319 A1* | 1/2020 | Herzerg | H04L 9/0819 |
| 2020/0186350 A1* | 6/2020 | Wentz | G06F 21/62 |
| 2020/0313877 A1* | 10/2020 | Mondello | H04L 9/0637 |
| 2020/0403984 A1* | 12/2020 | Minehan | H04L 9/3247 |
| 2021/0011992 A1* | 1/2021 | Wurmfeld | G06F 21/44 |
| 2021/0152539 A1* | 5/2021 | Xie | H04L 63/083 |
| 2021/0294967 A1* | 9/2021 | Goodsitt | G06V 30/416 |
| 2021/0297252 A1* | 9/2021 | Licciardello | H04L 9/3218 |
| 2021/0344483 A1* | 11/2021 | Zeigler | H04L 9/14 |
| 2021/0385129 A1* | 12/2021 | Shadbolt | H04L 63/0876 |
| 2021/0409201 A1* | 12/2021 | Mondello | H04L 41/28 |
| 2022/0083326 A1* | 3/2022 | Du | G06F 8/71 |
| 2022/0393869 A1* | 12/2022 | Baldwin | H04L 9/0825 |
| 2023/0031621 A1* | 2/2023 | Pepe | H04L 9/50 |
| 2023/0035360 A1* | 2/2023 | Holland | G06V 10/758 |

FOREIGN PATENT DOCUMENTS

| | | | | |
|---|---|---|---|---|
| FR | 3104868 A1 * | 6/2021 | | H04L 9/3066 |
| NO | 2021113881 A1 | 6/2021 | | |
| WO | WO-2021113881 A1 * | 6/2021 | | G06F 21/62 |
| WO | WO-2021191158 A1 * | 9/2021 | | G06T 19/006 |

OTHER PUBLICATIONS

Kursawe, Klaus, and Christiane Peters. "Structural weaknesses in the open smart grid protocol." In 2015 10th International Conference on Availability, Reliability and Security, pp. 1-10. IEEE, 2015 (Year: 2015).*

Won, Jongho, Seung-Hyun Seo, and Elisa Bertino. "A secure shuffling mechanism for white-box attack-resistant unmanned vehicles." IEEE Transactions on Mobile Computing 19, No. 5 (2019): 1023-1039. (Year: 2019).*

Lohr. "Choosing security elements for the xAAL home automation system." In 2016 Intl IEEE Conferences on Ubiquitous Intelligence & Computing, Advanced and Trusted Computing, Scalable Computing and Communications, Cloud and Big Data Computing, pp. 534-541. IEEE, 2016 (Year: 2016).*

Malik, Manisha, Maitreyee Dutta, and Jorge Granjal. "A survey of key bootstrapping protocols based on public key cryptography in the Internet of Things." IEEE Access 7 (2019): 27443-27464. (Year: 2019).*

International Search Report and Written Opinion—PCT/US2022/036726—ISA/EPO—Oct. 27, 2022.

* cited by examiner

EXTENDED REALITY CONTROL OF SMART DEVICES

TECHNICAL FIELD

The present disclosure generally relates to extended reality systems. For example, aspects of the present disclosure relate to using extended reality systems to control smart devices.

BACKGROUND

Extended reality (e.g., augmented reality, virtual reality, etc.) devices, such as smart glasses and head-mounted displays (HMDs), generally implement cameras and sensors to track the position of the extended reality (XR) device and other objects within the physical environment. The XR reality devices can use the tracking information to provide a user of the XR device a realistic XR experience. For example, an XR device can allow a user to experience or interact with immersive virtual environments or content. To provide realistic XR experiences, XR technologies can integrate virtual content with the physical world, which can involve matching the relative pose and movement of objects and devices. The XR technologies can use tracking information to calculate the relative pose of devices, objects, and/or maps of the real-world environment in order to match the relative position and movement of the devices, objects, and/or the real-world environment, and anchor content to the real-world environment in a convincing manner. The relative pose information can be used to match virtual content with the user's perceived motion and the spatio-temporal state of the devices, objects, and real-world environment.

Some electronic devices, such as XR devices and other electronic devices (e.g., mobile phones, smart watches, tablets, etc.) can be paired with other devices to interact with the other devices. For example, electronic devices can be paired with Internet-of-Things (IoT) devices such as smart-home devices (e.g., smart cameras, speakers, light bulbs, locks, plugs, thermostats, displays, televisions (TVs), etc.), to control the IoT devices. In some cases, the process to configure an electronic device to control an IoT device or other device can involve manual efforts. Further, a user can grant another user access to control an IoT device or another device through the other user's device.

BRIEF SUMMARY

Disclosed are systems, methods, and computer-readable media for controlling one or more devices (e.g., Internet-of-Things (IoT) devices, such as smart devices, connected devices, etc.) using an extended reality (XR) device. According to at least one example, a method is provided for using an XR device to control one or more IoT devices. For example, a method of processing one or more messages can include: generating, by a first computing device, a cryptographic key, outputting, by the first computing device, a pattern that encodes the cryptographic key, the pattern comprising at least one of a visual pattern, an audio pattern, and a light pattern, receiving, from a second computing device, a signed message comprising a command to modify an operation of the first computing device; determining, by the first computing device, whether the signed message is signed with the cryptographic key encoded in the pattern; and based on a determination that the signed message is signed with the cryptographic key encoded in the pattern, modifying, by the first computing device, the operation of the first computing device according to the command in the signed message.

In another example, an apparatus for processing one or more messages is provided that includes a memory configured to store at least one frame and one or more processors (e.g., implemented in circuitry) and coupled to the memory. The one or more processors are configured to and can: generate a cryptographic key; output a pattern that encodes the cryptographic key, the pattern comprising at least one of a visual pattern, an audio pattern, and a light pattern; receive, from a computing device, a signed message comprising a command to modify an operation of the apparatus; determine whether the signed message is signed with the cryptographic key encoded in the pattern; and based on a determination that the signed message is signed with the cryptographic key encoded in the pattern, modify the operation of the apparatus according to the command in the signed message.

In another example, a non-transitory computer-readable medium of a first computing device is provided that has stored thereon instructions that, when executed by one or more processors, cause the one or more processors to: generate a cryptographic key; output a pattern that encodes the cryptographic key, the pattern comprising at least one of a visual pattern, an audio pattern, and a light pattern; receive, from a second computing device, a signed message comprising a command to modify an operation of the first computing device; determine whether the signed message is signed with the cryptographic key encoded in the pattern; and based on a determination that the signed message is signed with the cryptographic key encoded in the pattern, modify the operation of the second computing device according to the command in the signed message.

In another example, an apparatus for processing one or more messages is provided. The apparatus includes: means for generating a cryptographic key; means for outputting a pattern that encodes the cryptographic key, the pattern comprising at least one of a visual pattern, an audio pattern, and a light pattern; means for receiving, from a computing device, a signed message comprising a command to modify an operation of the apparatus; means for determining whether the signed message is signed with the cryptographic key encoded in the pattern; and means for, based on a determination that the signed message is signed with the cryptographic key encoded in the pattern, modifying the operation of the apparatus according to the command in the signed message.

In some aspects, the method, apparatuses, and computer-readable medium described above can include: receive an additional signed message comprising one or more commands to modify one or more operations of the apparatus; determine that the additional signed message was signed using a valid cryptographic key encoded in an additional pattern generated by a different computing device; and in response to determining that the additional signed message was signed using the valid cryptographic key encoded in the additional pattern generated by the different computing device, modify the one or more operations of the apparatus according to the one or more commands in the additional signed message.

In some aspects, the method, apparatuses, and computer-readable medium described above can include: determine that the valid cryptographic key is valid based on a determination that the valid cryptographic key is a matching copy of a particular cryptographic key at the apparatus.

In some aspects, the method, apparatuses, and computer-readable medium described above can include: receive an additional signed message comprising one or more commands to modify one or more operations of the apparatus; determine that the additional signed message was signed using a copy of a shared key generator used by the apparatus and a different computing device; and in response to determining that the additional signed message was signed using the copy of the shared key generator used by the apparatus and the different computing device, modify the one or more operations of the apparatus according to the one or more commands in the additional signed message.

In some aspects, the method, apparatuses, and computer-readable medium described above can include: verify that the signed message comprises a biometric feature; and modify the operation of the apparatus according to the command in the signed message based on the determination that the signed message is signed with the cryptographic key encoded in the pattern and based on verifying that the signed message comprises the biometric feature.

In some aspects, the method, apparatuses, and computer-readable medium described above can include: verify that the computing device is connected to a same local network as the apparatus; and modify the operation of the apparatus according to the command in the signed message based on the determination that the signed message is signed with the cryptographic key encoded in the pattern and based on verifying that the computing device is connected to the same local network as the apparatus.

In some aspects, the method, apparatuses, and computer-readable medium described above can include: determine a number of cryptographic keys generated by the apparatus after the cryptographic key is below a threshold; based on determining that the number of cryptographic keys is below the threshold, determine that the cryptographic key has not expired; and based on determining that the cryptographic key has not expired, accept the signed message signed with the cryptographic key.

In some aspects, the method, apparatuses, and computer-readable medium described above can include: receive, from the computing device, an additional message comprising one or more commands to modify one or more operations of the apparatus; determine that the additional message is missing a signature associated with a valid cryptographic key generated by the apparatus; and based on determining that the additional message is missing the signature associated with the valid cryptographic key generated by the apparatus, reject the one or more commands to modify the one or more operations of the apparatus.

In some aspects, the apparatus is paired with the computing device. In such aspects, the method, apparatuses, and computer-readable medium described above can include: rejecting the one or more commands after the pairing of the apparatus and the computing device based on determining that the additional message is missing the signature associated with the valid cryptographic key generated by the apparatus.

In some aspects, the light pattern comprises at least one of a light dimming and brightening pattern and a pattern of color temperature changes.

In some aspects, the visual pattern comprises at least one of a display pattern and a visual code.

In some aspects, one or more of the apparatuses described above is, can be part of, or can include an Internet-of-Things (IoT) device and/or an XR device (e.g., a virtual reality (VR) device, an augmented reality (AR) device, or a mixed reality (MR) device). In some aspects, the apparatus (or first computing device) comprises a smart home device and the computing device (or second computing device) comprises an extended reality device. In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. For instance, the one or more sensors can include at least one of a light sensor, an audio sensor, a motion sensor, a temperature sensor, a humidity sensor, an image sensor, an accelerometer, a gyroscope, a pressure sensor, a touch sensor, and a magnetometer. In some cases, the one or more sensors can be used for determining a location of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
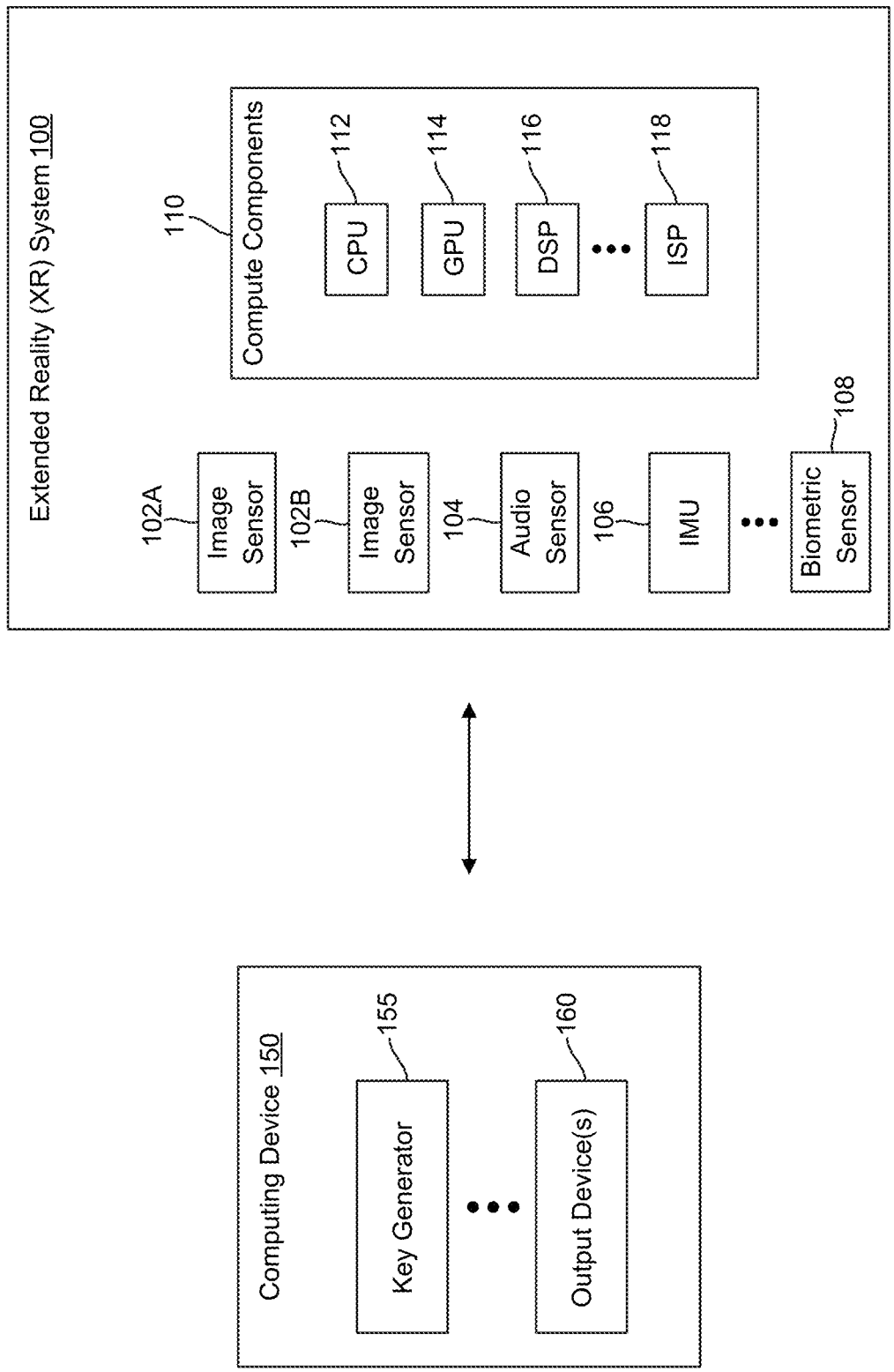
FIG. 1 is a diagram illustrating an example of an extended reality system used to control a computing device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Extended reality (XR) devices and other electronic devices (e.g., mobile phones, smart wearable devices, tablet computers, laptop computers, etc.) can be used to control certain devices, such as Internet-of-Things (IoT) devices. Examples of such devices that can be controlled include smart home or connected devices (e.g., smart hubs, lightbulbs, speakers, cameras, doorbells, security systems, locks, televisions, etc.). For example, a user can configure an XR device to control a smart speaker, a smart light, or other IoT device in a room. To illustrate, in the example of a smart light, the user can conveniently control the smart light by interacting with an interface of the XR device rather than using a light switch to turn on or off a light in the room. However, the process to configure an XR device or another electronic device to control an IoT device can involve manual efforts and can be difficult and even confusing for users. Moreover, it can be difficult to manage access to a user's IoT device by other users and limit the other users' future access to the IoT device after such access is granted. For example, a user can grant another user, such as a visitor, access to control an IoT device through the other user's device. However, after receiving access to the IoT device, the other user's device typically remains with permanent access to the IoT device while the other user's device is within a certain range of the IoT device and/or connected to a same local network as the other user's device, which can be undesirable and may present security concerns.

In some cases, to configure an electronic device, such as an XR device, to control an IoT device such as a smart home device, a user can operate the electronic device so that it is permanently paired with the IoT device that the user wishes to control using the electronic device. After such pairing, the electronic device generally maintains permanent access to the IoT device. If the user wants to grant another user access to the IoT device, the user can allow the other user to pair the other user's electronic device with the IoT device. The other user is then left with permanent access to the IoT device. For example, after pairing a visitor's electronic device with a smart light at the user's home, the visitor's electronic device can remain with access to the smart light after leaving the user's home and can control the smart light after leaving the user's home. To limit future access of another user's device to an IoT device, the user can cause the other user's electronic device to be unpaired or otherwise removed from the IoT device. However, the process of unpairing the devices or removing access to the IoT device is not seamless and can be inconvenient, time-consuming, and even difficult.

In some cases, the user can allow devices (e.g., an XR device or any other electronic device) on the user's wireless local area network (e.g., the user's Wi-Fi network) to control an IoT device on the wireless local area network. In such cases, the user can localize access of another user's device to the general vicinity of the IoT device, since the other user's device will need to be connected to the wireless local area network to control the IoT device. However, this mechanism of using the wireless local area network to control access involves a permanent pairing that not only grants the other user's device with permanent access to the IoT device but also leaves the other user's device with access to the wireless local area network. For example, to grant the other user access to the wireless local area network, the user typically provides the other user with security credentials (e.g., a Wi-Fi key or password) which the other then uses to allow their device to access the wireless local area network and establish access/control of the IoT device. This process can be inconvenient as it can involve manual steps such as exchanging security credentials. Such a process can also be undesirable and present security concerns, such as when granting other users' devices with access to wireless local area networks and IoT devices in public spaces.

Indeed, any user with access to the wireless local area network and IoT device can later access the wireless local area network and IoT device if such access is not removed, even if such future access was not intended or desired by the owner/administrator of the wireless local area network and/ or IoT device. In many cases, a user (e.g., a visitor, guest, etc.) that is given access to the wireless local area network and IoT device can potentially access the wireless local area network and IoT device remotely. For example, such a user may potentially access the wireless local area network and control the IoT device remotely using directional transceivers, remote tunnels such as virtual private networks (VPNs), remote connections/commands such as secure shell commands/connections, etc.

As illustrated above, if a user wishes to grant another user's device with temporary access to an IoT device, the user may need to perform a number of manual, time-consuming, and often confusing steps when the user wishes to add and/or remove access of the other user's device to the IoT device. The process can be inconvenient and even deter a user from granting another user access to an IoT device if the user does not intend for such access to be permanent. Moreover, such access can present a number of security concerns if it is not properly removed when the user granting such access no longer intends for the other user to maintain access. In many cases, the inability to easily or seamlessly remove access to an IoT device or grant users temporary access to the IoT device can make it unfeasible to grant such access to users in public spaces, particularly given the security concerns of allowing users permanent or on-going access to IoT devices in public spaces.

Systems, apparatuses, processes (also referred to as methods), and computer-readable media (collectively referred to herein as "systems and techniques") are described herein for managing access of electronic devices to controllable devices, such as IoT devices. While IoT devices are used herein as examples of controllable devices, the techniques described herein can be performed by or for any device that is controllable by another device. In some examples, an IoT device can generate security data (e.g., a cryptographic key, a token, a random string and/or number, etc.) for use by an electronic device (e.g., an XR device, a mobile phone, a smart watch, a tablet, or other device) to obtain access to the IoT device. For illustrative purposes, cryptographic keys are used throughout the disclosure as examples of security data implemented by the systems and techniques described herein. However, a cryptographic key is merely one illustrative example of the security data referenced herein, and other examples can include other security data and/or combinations of security data such as, for example and without limitation, a token, a random string and/or number, etc.

In some examples, the IoT device can generate shifting cryptographic keys that change based on one or more factors such as time, events, conditions, etc. For example, an IoT device, such as a smart-home device, can generate a cryptographic key every n number of time units (e.g., seconds, minutes, etc.) via a number of rounds of a cryptographic hash function. In one illustrative example, an IoT device can generate a cryptographic key every n seconds via a number of rounds of a Secure Hash Algorithm-256 (SHA-256) cryptographic algorithm using a feed string, such as a phrase. In some examples, to shift the keys, the IoT device can generate each key using the feed string plus n, where the string is a base key and n is an incrementing index as new keys are generated/used. The IoT device can output (e.g., share, broadcast, present, advertise, etc.) the generated key, such as by displaying the key (e.g., displaying a visual pattern representing the key), outputting an audio signal representing the key, outputting a light pattern (e.g., by dimming and/or brightening a device, generating a pattern of changing color temperature, etc.) representing the key, any combination thereof, and/or otherwise outputting the key. A nearby electronic device can detect and extract the key output by the IoT device. For instance, the nearby electronic device can include an electronic device (e.g., an XR device such as smart AR or VR glasses, an AR or VR HMD, etc.) within a range/proximity of the IoT device. The nearby electronic device can use the extracted key to cryptographically sign one or more commands (e.g., all commands) it sends to the IoT device. The IoT device can use the generated key to verify/validate the signed command and allow the sender of the signed command (e.g., the nearby electronic device) to temporarily control the IoT device.

Using a signed command as illustrated above, an electronic device can temporarily control an IoT device that generated the key used by the electronic device to sign the command. The electronic device can obtain such control of the IoT device without a manual network key exchange or pairing process and without requiring a central system (e.g., a server of a cloud-based service provider) to approve the pairing based on the key. By granting control based on signed commands, the IoT device can prevent the electronic device from obtaining permanent access to the IoT device or otherwise requiring an inconvenient, time-consuming, and/or manual process by a user (e.g., an owner of the IoT device) to remove access to the electronic device once such access is no longer desired/intended by the user. For example, the IoT device can set each generated key to expire based on one or more factors such as time, a specific event, a condition, a generation of a new (or a number of new) keys, etc. Once a key has expired, the IoT device may not accept a command signed by the expired key. Thus, an electronic device with access to the expired key cannot use the expired key to sign commands for controlling the IoT device. The electronic device may need to obtain a new key from the IoT device to gain control of the IoT device.

In some cases, the IoT device can be configured to allow/grant other electronic devices with control of the IoT device based on signed commands as previously explained, as well as other access procedures such as pairing, connectivity to a same wireless local area network, etc. For example, a user intending to grant an electronic device with permanent access to a smart-home device at the user's home can do so by pairing the smart-home device with the electronic device or connecting both devices to the same local network (e.g., Wi-Fi network). If a visitor wishes the visitor's electronic device to obtain temporary control of the smart-home device, the IoT device can grant such temporary control to the visitor's device using signed commands (signed with a private key) as previously described. This way, visitors can use their electronic devices to seamlessly obtain control of the smart-home device while the visitors are at the user's home, without otherwise receiving permanent access to the smart-home device or requiring a manual, inconvenient, or time-consuming process to remove such access once such access is no longer needed and/or desired/intended.

The IoT device can generate the key output in a number of ways. In some examples, the IoT device can output a particular pattern that encodes a key and/or can be translated by a nearby device into the key. To illustrate, in an example involving an IoT device having light-emitting capabilities (e.g., a smart television (TV), light bulb, etc.), the IoT device can output a pattern of dimming and brightening of the IoT device. The dimming and brightening pattern can encode a key and/or can be translated by a nearby device into the key. For example, a smart light bulb can dim and brighten its emitted light in a particular pattern that encodes the key and/or can be translated into the key. In some cases, the dimming and brightening pattern can be visible to the human eye (e.g., within the visible light spectrum). In other cases, the dimming and brightening pattern can be imperceptible to the human eye in terms of wavelength and/or duration. As another example, the IoT device can change the color temperature of the IoT device according to a pattern that encodes the key and/or can be translated into the key. The color temperature pattern can be visible to the human eye or imperceptible (e.g., in wavelength and/or duration) to the human eye.

In some examples, an IoT device can have display capabilities (e.g., a smart hub, TV, screen, etc.), audio capabilities, and/or output capabilities (e.g., displaying light patterns, etc.). In some cases, an IoT device with display capabilities can display a code and/or visual pattern, which can be visible to the human eye or imperceptible (e.g., in wavelength and/or duration) to the human eye. The visual pattern can encode the key described above (e.g., used to cryptographically sign a command) and/or can be translated into the key. In some cases, an IoT device with audio capabilities can output an audio pattern (e.g., Morse code or any other audio pattern), which can be perceptible to the human ear or imperceptible to the human ear in duration and/or frequency (e.g., ultrasound). In other examples, the IoT device can output any other type of pattern or combination of patterns, such as a combination of light, color temperature, visual, and/or audio patterns.

In some cases, to avoid race conditions, the IoT device can accept commands signed by a certain number of preceding keys (e.g., a number of keys issued/generated before a latest/newest key). For example, the IoT device can periodically output a different key. Rather than only accepting commands signed with the latest key, the IoT device can accept commands signed by any of the last n number of keys generated by the IoT device.

In some cases, a group of nearby IoT devices can share a same key such that an electronic device that extracts the key from one of the IoT devices can also control any of the other IoT devices in the group. For example, in some cases, a user with an electronic device that has visibility to a smart TV may wish to turn off nearby smart lights in order to watch TV, but some or all of the smart lights may be in a nearby room or behind a corner/obstacle such that the electronic device does not have visibility to such smart lights. In such cases, the electronic device may not be able to detect a light pattern from such smart lights to extract a separate key for each of the smart lights. However, the smart lights and TV may share a key to allow the electronic device to control the TV and smart lights using the same key. In some examples where the key is generated with a number of rounds of a hashing function based on a string plus n where the string is a base key and n is an incrementing index as new keys are needed/generated, the various IoT devices (e.g., the smart TV and lights in the previous example) can share the same base key string and can perform a synchronization operation (e.g., via wireless radio) to increment the respective value of n used for each key.

For added security, in some cases, an IoT device can implement multi-factor signing/authentication. The multi-factor signing/authentication can include the key signing described herein and one or more additional security/authentication factors. For example, an IoT device can implement a second security factor based on a device/network connectivity. To illustrate, the IoT device may require a signed command as previously described, and may also require that the electronic device sending the signed command be on a specific (e.g., a same) local network (or that the signed command be received via a specific/same wireless local area network) in order to accept the command. In some examples, to grant control to an electronic device, an IoT device may not only require a signed command from the electronic device, but may also require that the electronic device be connected to the same Wi-Fi network as the IoT device.

As another example, in addition to requiring commands to be signed as described herein, an IoT device may require signing or authorization using biometric data. For example, to grant control to an electronic device, the IoT device can require a biometric feature vector along with a signed command from the electronic device. For example, if a user wishes to allow control of a smart TV at the user's home only to devices of certain users and only when they are in the user's home, the IoT device can limit IoT device control to devices of such users based on the biometric feature vector. In such cases, use of the signed command can limit the IoT device control to users' devices that are located in the home.

Thus, in this example, the IoT device can use a combination of the signed command and the biometric features to limit control of the IoT device.

Various aspects of the application will be described with respect to the figures.

FIG. 1 is a diagram illustrating an example of an XR system 100 used to control a computing device 150, in accordance with some examples of the present disclosure. The XR system 100 can be used to control the computing device 150 using XR and/or any other techniques described herein. The computing device 150 can include an IoT/smart device such as, for example and without limitation, a smart wearable device (e.g., a smart watch, ring, bracelet, glove, medical/fitness tracker, etc.), a smart lock, a smart bicycle, a smart security system, a smart light, a smart hub, a smart camera, a smart refrigerator, a smart speaker, a smart medical sensor, a smart television, a smart thermostat, a robotic vacuum cleaner, a mobile computing device (e.g., a laptop computer, a tablet computer, a smartphone, etc.), a video game system, a global positioning system (GPS) device, a smart alarm, a smart scanner, a connected appliance, smart equipment, an embedded system, a smart home device, or any other smart, connected, and/or wireless device.

The XR system 100 and the computing device 150 can be communicatively coupled to allow the XR system 100 to control the computing device 150, as further described herein. In some examples, the XR system 100 can implement one or more XR applications such as, for example and without limitation, an XR application for managing and/or controlling computing devices (e.g., computing device 150), a smart home application, a video game application, a robotic application, an autonomous driving or navigation application, a productivity application, a social media application, a communications application, a media application, an electronic commerce application, and/or any other XR application.

In some examples, the XR system 100 can include an electronic device configured to use information about the relative pose of the XR system 100 and/or the computing device 150 to provide one or more functionalities, such as XR functionalities (e.g., tracking, detection, classification, mapping, content rendering, etc.), device management and/or control functionalities, gaming functionalities, autonomous driving or navigation functionalities, computer vision functionalities, robotic functions, etc. For example, in some cases, the XR system 100 can be an XR device (e.g., a head-mounted display, a heads-up display device, smart glasses, etc.) configured to detect and map the location of the computing device 150 and communicate with the computing device 150 to control one or more operations/states of the computing device 150.

In the illustrative example shown in FIG. 1, the XR system 100 can include one or more image sensors, such as image sensors 102A and 102B (collectively "102" hereinafter), an audio sensor 104 (e.g., an ultrasonic sensor, a microphone, etc.), an inertial measurement unit (IMU) 106, and one or more compute components 110. The XR system 100 can optionally include a biometric sensor 108 for sensing biometric features (e.g., fingerprints, facial features, eye recognition features, voice recognition features, etc.) and/or other sensors. In some examples, the XR system 100 can include one or more other sensors such as, for example and without limitation, a radar, a light detection and ranging (LIDAR) sensor, a pressure sensor (e.g., a barometric air pressure sensor and/or any other pressure sensor), a gyroscope, an accelerometer, a magnetometer, and/or any other sensor. In some examples, the XR system 100 can include additional sensors and/or components such as, for example, a light-emitting diode (LED) device, a storage device, a cache, a communications interface, a display, a memory device, etc. An example architecture and example hardware components that can be implemented by the XR system 100 are further described below with respect to FIG. 7.

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s). In some implementations, the image sensors 102, the audio sensor 104, the IMU 106, the biometric sensor 108, and/or the one or more compute components 110 can be part of the same computing device.

For example, in some cases, the image sensors 102, the audio sensor 104, the IMU 106, the biometric sensor 108, and/or the one or more compute components 110 can be integrated with or into a camera system, a smartphone, a laptop, a tablet computer, a smart wearable device, an XR device such as an HMD, an IoT device, a gaming system, and/or any other computing device. However, in other implementations, the image sensors 102, the audio sensor 104, the IMU 106, the biometric sensor 108, and/or the one or more compute components 110 can be part of, or implemented by, two or more separate computing devices.

The one or more compute components 110 of the XR system 100 can include, for example and without limitation, a central processing unit (CPU) 112, a graphics processing unit (GPU) 114, a digital signal processor (DSP) 116, and/or an image signal processor (ISP) 118. In some examples, the XR system 100 can include other types of processors such as, for example, a computer vision (CV) processor, a neural network processor (NNP), an application-specific integrated circuit (ASIC), a field-programmable gate array (FPGA), etc. The XR system 100 can use the one or more compute components 110 to perform various computing operations such as, for example, extended reality operations (e.g., tracking, localization, object detection, classification, pose estimation, mapping, content anchoring, content rendering, etc.), device control operations, image/video processing, graphics rendering, machine learning, data processing, modeling, calculations, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensors 102 can include any image and/or video sensor or capturing device, such as a digital camera sensor, a video camera sensor, a smartphone camera sensor, an image/video capture device on an electronic apparatus such as a television or computer, a camera, etc. In some cases, the image sensors 102 can be part of a camera or computing device such as a digital camera, a video camera, an IP camera, a smartphone, a smart television, a game system, etc. Moreover, in some cases, the image sensors 102 can include multiple image sensors, such as rear and front sensor devices, and can be part of a dual-camera or other multi-camera assembly (e.g., including two camera, three cameras, four cameras, or other number of cameras).

In some examples, each image sensor of the image sensors 102 a can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform XR processing operations based on data from one or more of the image sensors 102, the audio sensor 104, the IMU 106, the biometric sensor 108, and/or the computing device 150. For example, in some cases, the one or more compute components 110 can perform tracking, localization, object detection, object classification, pose estimation, shape estimation, mapping, content anchoring, content rendering, image processing, modeling, content generation, gesture detection, gesture recognition, and/or other operations based on data from the image sensors 102, the audio sensor 104, the IMU 106, the biometric sensor 108, and/or the computing device 150. In some examples, the one or more compute components 110 can perform detect, localize, and map the computing device 150 and control an operation/state of the computing device 150, based on data from the image sensors 102, the audio sensor 104, the IMU 106, the biometric sensor 108, and/or the computing device 150.

In some examples, the one or more compute components 110 can implement one or more algorithms for tracking and estimating a relative pose of the computing device 150 and the XR system 100. In some cases, the one or more compute components 110 can receive image data captured by one or more of the image sensors 102 and perform pose estimation based on the received image data to calculate a relative pose of the computing device 150 and the XR system 100. In some examples, the one or more compute components 110 can receive sensor data (e.g., image data from image sensors 102, data from the audio sensor 104, the IMU 106, etc.), and use such data to track and/or map the computing device 150 and adjust an operation/state of the computing device 150, as described herein. In some cases, the one or more compute components 110 can implement one or more computer vision models to calculate the relative pose of the computing device 150 and the XR system 100.

In some cases, the XR system 100 can use one or more of the image sensors 102 to detect visual/light patterns generated by the computing device 150. The visual/light patterns can encode security/authorization data (e.g., one or more cryptographic keys, one or more tokens, etc.), that the XR system 100 can extract from the visual/light patterns to detect/localize the computing device 150 and/or sign messages/commands for controlling the computing device 150, as further explained herein. In some examples, the visual/light patterns can include a pattern(s) of dimming and brightening light emitted by the computing device 150, a pattern of changing color temperature of light emitted by the computing device 150, a display pattern (e.g., a quick response (QR) code, a barcode, a displayed object, a displayed image, etc.), and/or any other light/visual pattern.

In some cases, the XR system 100 can use audio sensor 104 to detect an audio pattern generated by the computing device 150. The audio pattern can encode security/authorization data (e.g., one or more cryptographic keys, one or more tokens, etc.) that the XR system 100 can extract from the audio pattern to detect/localize the computing device 150 and/or sign messages/commands for controlling the computing device 150, as further explained herein. In some examples, the audio pattern can include a pattern of acoustic data such as, for example, a Morse code, a noise sequence, and/or any other modulated sound or pattern of sound. In some cases, the XR system 100 can use the audio sensor 104 to measure distance information to assist in tracking, localization, mapping, and/or other XR functionalities. For example, the XR system 100 can use the audio sensor 104 to measure a distance between the XR system 100 and the computing device 150.

In some cases, the IMU 106 can detect an acceleration, angular rate, and/or orientation of the XR system 100 and generate measurements based on the detected acceleration. In some cases, the IMU 106 can detect and measure the orientation, linear velocity, and/or angular rate of the XR system 100. For example, the IMU 106 can measure the pitch, roll, and yaw of the XR system 100. In some examples, the XR system 100 can use measurements obtained by the IMU 106 and/or image data from one or more of the image sensors 102 to calculate the relative pose of the XR system 100. In some cases, the XR system 100 can additionally or alternatively use sensor data from the audio sensor 104 and/or the computing device 150 to perform tracking, pose estimation, mapping, and/or other operations.

The XR system 100 can optionally implement the biometric sensor 108 to capture biometric data of one or more users to authenticate/verify the one or more users based on biometric data. In some examples, the XR system 100 can use the biometric sensor 108 to capture biometric features from one or more users and use biometric data captured to control or limit a control of the computing device 150, as further explained herein. For example, the XR system 100 can use biometric data from the biometric sensor 108 to limit a control of the computing device 150 through the XR system 100 to one or more specific users.

In the illustrative example shown in FIG. 1, the computing device 150 includes a security data generator 155. The security data generator 155 can implement one or more algorithms for generating keys, tokens, and/or other security data, which can be used to authenticate, verify, and/or authorize a device/user having possession of one or more of the keys, tokens, and/or other security data. For example, in some cases, the security data generator 155 can implement one or more cryptographic hash functions to generate keys that the XR system 100 can use to sign control messages/commands to the computing device 150, as explained herein. Non-limiting examples of a cryptographic hash function include a message-digest (MD) algorithm or a secure hash algorithm (SHA), such as SHA-224, SHA-256, SHA-384, SHA-512, etc. In some cases, the security data generator 155 can include a trusted platform module (TPM) or cryptographic processor configured to generate security data such as cryptographic keys, random strings, etc.

In some cases, the security data generator 155 can use one or more inputs (e.g., one or more seed words, values, phrases, characters, etc.) to generate a key based on one or more hash algorithms. In some examples, the security data generator 155 can implement a number of rounds of a hash algorithm to generate a key.

The computing device 150 can encode security data (e.g., a key, a token, a random string or number, etc.) generated by the security data generator 155, into a pattern emitted by the output device(s) 160 of the computing device 150, such as a visual/display pattern, a light pattern, an audio pattern, and/or any combination thereof. The XR system 100 can detect the pattern emitted by the output device(s) 160 and extract the encoded security data from the pattern. The XR system 100 can use the extracted security data to sign one or more control messages/commands sent to the computing device 150 to control/adjust an operation/state of the computing device 150, such as a power state of the computing device 150, an output(s) of the computing device 150, a behavior of the computing device 150, one or more operations of the computing device 150, etc.

The output device(s) 160 can include one or more sensors and/or components such as, for example and without limitation, a display, a speaker, a microphone, an image sensor, an LED device, a pressure sensor, an IMU, a light-emitting device, a communication interface (e.g., wireless radio, etc.), a radar, etc. In some examples, the computing device 150 can include one or more wireless communication interfaces (not shown) for communicating with the XR system 100. In some examples, the communication interface can include a wireless transmitter, a wireless transceiver, or any other means for wireless communications and/or transmitting data. The communication interface can implement any wireless protocol and/or technology to communicate with the XR system 100, such as Wi-Fi, Bluetooth, ZigBee, cellular, etc. In other examples, the computing device 150 can include more or less sensors, output device(s), and/or components (of the same and/or different types) than shown in FIG. 1. In some cases, the computing device 150 can include one or more other components that are not shown in FIG. 1 such as, for example and without limitation, a microcontroller, an actuator, a storage device, memory, cache, a processing device, etc.

The components shown in FIG. 1 with respect to the XR system 100 and the computing device 150 are merely illustrative examples provided for explanation purposes. In other examples, the XR system 100 and/or the computing device 150 can include more or less components than those shown in FIG. 1. While the XR system 100 and the computing device 150 are shown to include certain components, one of ordinary skill will appreciate that the XR system 100 and the computing device 150 can include more or fewer components than those shown in FIG. 1. For example, the XR system 100 and/or the computing device 150 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the XR system 100 and/or the computing device 150 are described below with respect to FIG. 7.

Figure 2A:
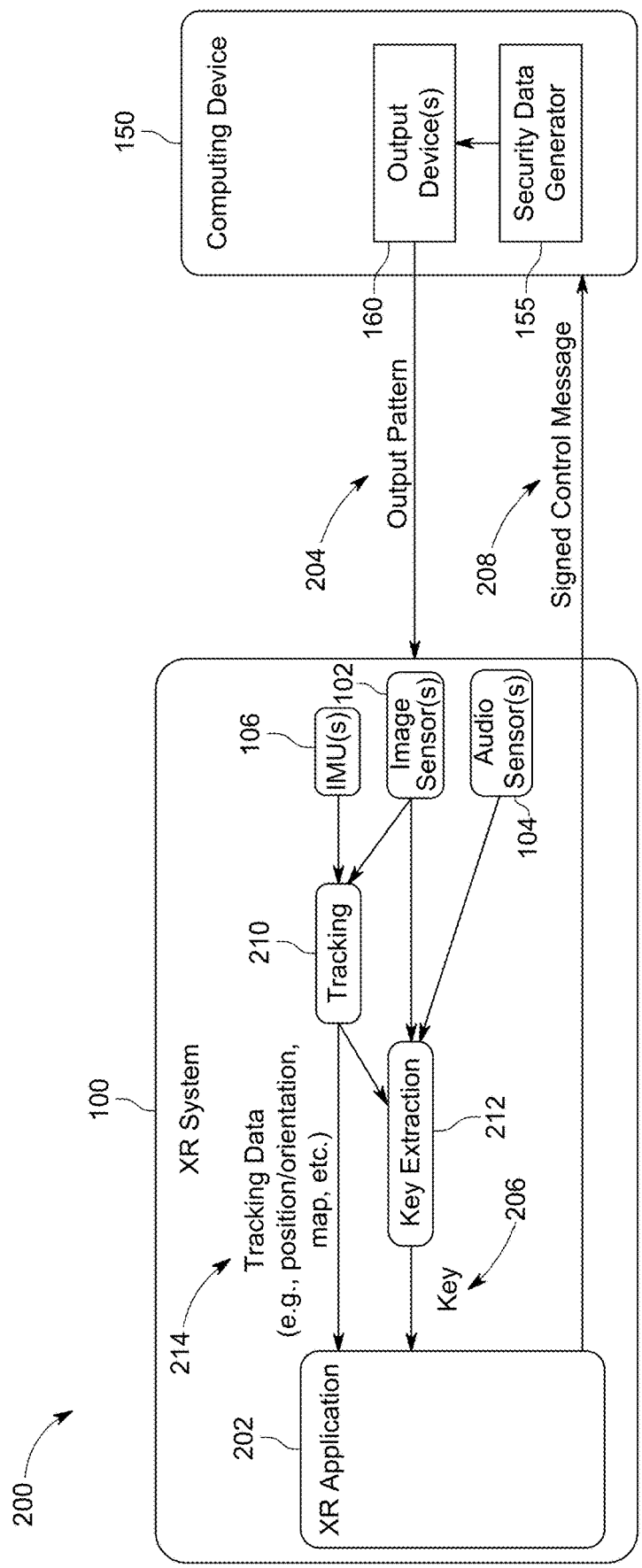
FIG. 2A is a diagram illustrating an example system for controlling a computing device using an extended reality system, in accordance with some examples of the present disclosure.

FIG. 2A is a diagram illustrating an example system 200 for controlling the computing device 150 using the XR system 100. As previously noted, the computing device 150 can include an IoT/smart device such as, for example and without limitation, a smart wearable device (e.g., a smart watch, ring, bracelet, glove, medical/fitness/health tracker, etc.), a smart lock, a smart bicycle, a smart security system, a smart light, a smart hub, a smart camera, a smart refrigerator, a smart speaker, a smart medical sensor, a smart television, a GPS device, a mobile computer, a video game console, a smart alarm, a smart scanner, a connected appliance, smart equipment, a smart home device, an embedded system, or any other smart, connected, and/or wireless device. The example system 200 can enable the XR system 100 to obtain permissions and/or authorization to control one or more operations and/or states of the computing device 150.

For example, in the example system 200, the XR system 100 can detect a pattern (e.g., a visual/display pattern, a light pattern, an audio pattern, etc.) emitted by the computing device 150 that encodes security data (e.g., a key, a token, a random string or number, etc.) that the XR system 100 can use to sign a control message/command to the computing device 150. The control message/command can be used to control one or more operations/states of the computing device 150. The computing device 150 can verify that the control message/command from the XR system 100 is signed with the security data encoded in the pattern emitted by the computing device 150. Once the computing device 150 verifies that the control message/command is signed with the security data, the computing device 150 can authorize/accept the control message/command and implement the requested operation/state. The computing device 150 can verify the security data by, for example, comparing the security data used to sign the control message/command with the security data that the computing device 150 encoded in the pattern emitted by the computing device 150. In some cases, the computing device 150 can verify the security data by using the security data that the computing device 150 encoded in the pattern emitted by the computing device 150 to decode the signed control message/command and/or the security data used to sign the signed control message/command.

The computing device 150 can use the security data generator 155 to generate security data (e.g., a key, a token, a random string and/or number, etc.) to encode in an output pattern 204 that the output device 160 can output for detection by a nearby device, such as XR system 100. For explanation purposes, a cryptographic key is used in various examples herein as a non-limiting example of security data generated by the security data generator 155 and implemented by the computing device 150. However, a cryptographic key is merely one illustrative example of security data generated by the security data generator 155 and implemented by the computing device 150, and other examples can include other security data and/or combinations of security data such as, for example and without limitation, a token, a random string and/or number, etc.

The output pattern 204 can include a light, visual, and/or audio pattern generated by the output device 160. For example, in some cases, the output device 160 can include light-emitting capabilities and the output pattern 204 can include a dimming and brightening light pattern. The dimming and brightening pattern can encode a key generated by the security data generator 155. The dimming and brightening pattern can be visible to the human eye (e.g., within the visible light spectrum) or imperceptible to the human eye in terms of wavelength and/or duration. As another example, the output pattern 204 can include a pattern of changes to a color temperature of light emitted by the output device 160. The color temperature pattern can encode a key generated by the security data generator 155. The color temperature pattern can be visible to the human eye or imperceptible (e.g., in wavelength and/or duration) to the human eye.

In other examples, the output pattern 204 can include a display pattern presented/displayed by the output device 160. The display pattern can include, for example, a code (e.g., a QR code, a bar code, a key, etc.), an image, one or more characters, a rendered content item (e.g., a virtual content item, a digital object, a graphic, etc.), and/or any visual pattern. The display pattern can encode a key generated by the security data generator 155. The display pattern be visible to the human eye or imperceptible (e.g., in wavelength and/or duration) to the human eye. In other examples, the output pattern 204 can include an audio pattern (e.g., Morse code, a sound, and/or any other audio pattern), which can be perceptible to the human ear or imperceptible to the human ear in duration and/or frequency (e.g., ultrasound). The audio pattern can encode the key generated by the security data generator 155. In other examples, the output pattern 204 can include any other type of pattern or combination of patterns, such as a combination of light, color temperature, visual, and/or audio patterns.

In some cases, the computing device 150 can broadcast an output pattern with an encoded key periodically. In some cases, the computing device 150 can broadcast an output pattern with an encoded key in response to a trigger or event, such as a trigger from a nearby device (e.g., XR system 100), a determination (e.g., based on sensor data from one or more sensors) that a device is nearby or within a proximity of the computing device 150, a user and/or device request, etc. The output pattern can be detected by a nearby device (e.g., XR system 100) located within a proximity to the computing device 150 and/or a position relative to the computing device 150. The distance and/or position of the nearby device that allows detection of the output pattern can limit the reach of the output pattern and the devices (and/or location of devices) that can detect the output pattern and extract the key in the output pattern to control an operation/state of the computing device 150. For example, the distance and/or position of the nearby device that allows detection of the output pattern can prevent remote devices from detecting the output pattern and extracting the key to control the computing device 150 if such remote devices are beyond a certain distance/proximity and/or at certain locations.

In some examples, the distance and/or position of the nearby device that allows detection of the output pattern can depend on the type of output pattern (e.g., light, visual, audio, etc.), the configuration of the output pattern, and/or how the output pattern is emitted. For example, a nearby device can detect a light/visual pattern from the computing device 150 when the light/visual pattern and/or the output device 160 is/are within a view of one or more image sensors of the nearby device. As another example, a nearby device can detect an audio pattern from the computing device 150 when a distance between the output device 160 and the nearby device is such that an audio sensor of the nearby device is able to detect the audio in the audio pattern emitted by the output device 160.

In some cases, the computing device 150 can vary the type of output pattern it broadcasts based on one or more factors such as, for example, a location of the computing device 150 (e.g., a private location, a public location, a location with a certain noise levels, a location with certain light or darkness levels, a location with a certain number or configuration of visual obstructions, etc.), a preference/setting indicating whether a nearby device should have a view to the output device 160, a type of environment, a size and/or configuration of a room where the computing device 150 is located, etc. For example, if a preference setting indicates that the output pattern can be made detectable by nearby devices that do not have a view of the output device 160 (e.g., by nearby devices having an image sensor(s) that does not have a view of the output device 160), the computing device 150 can broadcast an audio pattern and/or a light pattern that can be detected by a nearby device even if an image sensor of the nearby device does not have a view of the output device 160 (e.g., and does cannot detect a display pattern presented on the output device 160). If a preference setting indicates that the output pattern instead should be detectable only by nearby devices have a view of the output device 160 (e.g., by nearby devices having an image sensor(s) has a view of the output device 160), the computing device 150 can output a display pattern that can be detected by a nearby device when an image sensor of the nearby device has a view of the output device 160 and thus the display pattern presented on the output device 160.

In some examples, the output pattern 204 can include a sequence that can indicate to a device that detects the output pattern 204 that the output pattern 204 includes a key and/or is a specific type of pattern for providing a key to nearby devices to control an operation/state of the computing device 150. For example, the output pattern 204 can include a sequence, such as a bit sequence, that distinguishes the output pattern 204 from other types of light, visual, audio, and/or similar types of patterns. In some cases, a sequence(s) in an output pattern can signal the beginning, end, and/or any other point/portion of the output pattern. For example, a sequence in an output pattern can signal to a nearby device that detects the pattern that the sequence corresponds to a beginning of the output pattern before the portion of the output pattern that encodes the key. This way, a nearby device (e.g., XR system 100) that detects the output pattern, can determine if the amount of the output pattern detected by the nearby device includes the key or is sufficient to extract the key, or if the nearby device should instead wait for the computing device 150 to output another pattern so it can capture a sufficient amount of the output pattern to extract a key in the output pattern.

The XR system 100 can use one or more of the image sensors 102 and/or the audio sensor 104 to detect the output pattern 204 from the computing device 150. The XR system 100 can detect the output pattern 204 when the XR system 100 is within a certain proximity to the computing device 150 and/or when the XR system 100 is at a certain location relative to the computing device 150. The proximity and/or location of the XR system 100 to be able to detect the output pattern 204 can depend on one or more factors as previously explained, such as the type of output pattern (e.g., display, light, audio, etc.), an environment and/or location of the computing device 150 and/or the XR system 100, a configuration of the output pattern (e.g., a display size, a display location, an audio level, a light level, etc.), etc.

Once the one or more of the image sensors 102 and/or the audio sensor 104 has detected the output pattern 204, the XR system 100 can perform a key extraction 212 to extract the key 206 encoded in the output pattern 204. In some examples, the XR system 100 can analyze the output pattern 204 and detect the key 206 based on one or more features (e.g., light features, image features, audio features, etc.) of the output pattern 204.

In some examples, the XR system 100 can use data from one or more of the image sensors 102, the audio sensor 104, and/or the IMU 106 to perform tracking 210 to determine a position of the XR system 100 in an environment and/or relative to the computing device 150. In some examples, the tracking 210 can generate tracking data 214 for XR functionalities such as, for example, pose estimation, localization, mapping, etc. In some cases, the tracking data 214 can include data indicating a position and/or orientation of the XR system 100 in a scene/environment, a map (or portion of a map) of a scene/environment of the XR system 100. In some cases, a map in the tracking data 214 can locate one or more features/objects within a scene/environment of the XR system 100, such as a position and/or orientation of the computing device 150. In some examples, the XR system 100 can use the tracking data 214 to provide XR functionalities and/or allow XR-based interactions with the scene/environment (and/or objects in the scene/environment), such as the computing device 150. For example, the XR system 100 can use the tracking data 214 (and the key 206 as further explained herein) to allow a user of the XR system 100 to control the computing device 150 using hand gestures and/or through an XR interface on the XR system 100.

In some cases, the key extraction 212 can use the tracking data 214 to localize the device associated with the output pattern 204 (e.g., the computing device 150) and/or associate the key 206 with the computing device 150 and/or a location of the computing device 150. For example, the XR system 100 can use the tracking data 214 to determine that the output pattern 204 is from the computing device 150 and/or identify a location of the device that emitted the output pattern 204 based on information in the tracking data 214 about the location of the XR system 100 and/or the location of the computing device 150.

An XR application 202 on the XR system 100 can use the key 206 extracted by the key extraction 212 to generate a signed control message 208 that includes one or more commands/instructions for controlling/adjusting one or more operations and/or states of the computing device 150. For example, the XR application 202 can use the key 206 to sign a control message with a command/instruction to control the computing device 150. In some examples, the command/instruction for the computing device 150 can instruct the computing device 150 to turn off or on, adjust a light level of the computing device 150, play or stop a sound (e.g., a song, an alarm, a message, noise, a notification, etc.), change a power state of one or more components, start or stop a camera operation, generate an output, start or stop an operation at the computing device 150, and/or stop or implement any other operations and/or states.

The XR system 100 can send the signed control message 208 from the XR application 202 to the computing device 150. The computing device 150 can determine whether the signed control message 208 was signed with the key 206 encoded in the output pattern 204. For example, the computing device 150 can compare the key used to sign the signed control message 208 with the key that the computing device 150 encoded into the output pattern 204. If the keys match, the computing device 150 can authorize/accept the signed control message 208. If the keys do not match, the computing device 150 can reject the signed control message 208. For example, if the keys do not match, the computing device 150 can determine that the XR system 100 is not authorized to control the computing device 150 and can reject the signed control message 208.

If the computing device 150 authorizes/accepts the signed control message 208, the computing device 150 can execute the command(s)/instruction(s) in the signed control message 208. The computing device 150 can adjust one or more operations and/or states of the computing device 150 based on the command(s)/instruction(s) in the signed control message 208, as previously explained.

As noted above, the key 206 used to sign the control message can provide the XR system 100 temporary permission/authorization to control an operation(s)/state(s) of the computing device 150. In some examples, the XR system 100 can use the key 206 once (e.g., based on the signed control message 208) to control an operation(s)/state(s) of the computing device 150. In other examples, the XR system 100 can use the key 206 a certain number of times and/or for a certain period of time to control the operation(s)/state(s) of the computing device 150. For example, the computing device 150 can impose a restriction for use of the key 206 to prevent permanent or indefinite use of the key 206 to control the computing device 150. In some cases, the restriction of use of the key 206 can specify a maximum number times that the key 206 can be used (by a same device or multiple devices) to control the computing device 150 and/or sign control messages to the computing device 150. In other cases, the restriction of use of the key 206 can additionally or alternatively impose a time restriction on the use of the key 206. After the time restriction, the key 206 can expire and the XR system 100 can be required to use a different (e.g., newer) key.

In some cases, the restriction of use of the key 206 can additionally or alternatively can impose a restriction of a number of preceding keys (e.g., relative to the last key generated by the computing device 150) that can be used to control the computing device 150. For example, the restriction can specify that a nearby device (e.g., XR system 100) may only use the most recent key issued by the computing device 150 to control the computing device 150. In this example, the computing device 150 may reject any control message signed with a key that is older than the most recent key issued by the computing device 150. In other examples, the restriction can specify that a nearby device (e.g., XR system 100) may only use a key from the most recent n number of keys issued by the computing device 150 to control the computing device 150. In this example, the computing device 150 may reject any control message signed with a key that is older than the most recent n number of keys issued by the computing device 150.

In some cases, the computing device 150 can impose a multi-factor security/authorization requirement for nearby devices (e.g., XR system 100) to control the computing device 150. For example, the computing device 150 may not only require a control message from a nearby device to be signed with a key output by the computing device 150 (e.g., key 206) but may also require that nearby device be connected to a same network as the computing device 150. To illustrate, in addition to requiring that the signed control message 208 be signed using the key 206 from the computing device 150, the computing device 150 can require that the signed control message 208 be received by the computing device 150 from the XR system 100 via a specific wireless network, such as a Wi-Fi network to which the computing device 150 is connected. This way, the computing device 150 can ensure that a nearby device is not allowed to control the computing device 150 if such nearby device is not on the same network (or a specific network) as the computing device 150. In this example, a device without access to the key and the specific network may not be permitted by the computing device 150 to control the computing device 150.

In some cases, the multi-factor security/authorization requirement can additionally or alternatively require biometric authentication to allow a nearby device to control the computing device 150. For example, in addition to requiring that a control message from a nearby device be signed by a key issued by the computing device 150, the computing device 150 can require that such control message include biometric data/features of a user that has been granted permission to control the computing device 150. In this example, when the computing device 150 receives a control message, the computing device 150 can check that the control message is signed with a proper key and that the control message include biometric features matching those of a user that has permission to control the computing device 150. In some examples, the biometric authorization requirement can allow control of the computing device 150 to be limited to certain users, and the key requirement can allow control of the computing device 150 to be limited to nearby devices having possession of the appropriate key.

Figure 2B:
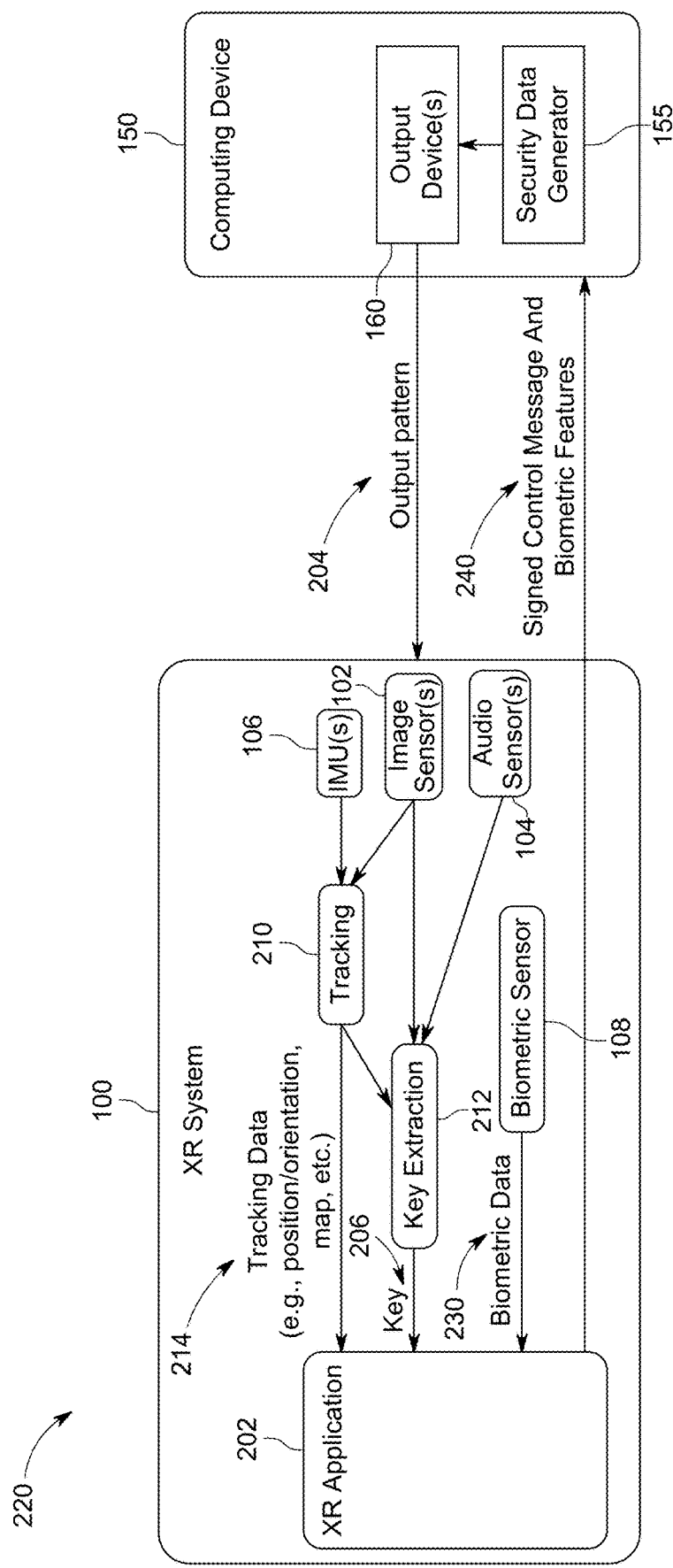
FIG. 2B is a diagram illustrating an example multi-factor system for controlling a computing device using an extended reality system, in accordance with some examples of the present disclosure.

FIG. 2B is a diagram illustrating an example multi-factor system 220 for controlling the computing device 150 using the XR system 100. In this example, the computing device 150 can emit the output pattern 204 and the XR system 100 can detect the output pattern 204 and extract the key 206 from the output pattern 204, as previously explained. In addition, the XR system 100 can include a biometric sensor 108 for obtaining biometric data 230 from a user(s). The XR application 202 can include the biometric data 230 obtained from the biometric sensor 108 in the signed control message 240. The signed control message 240 can be signed with the key 206, as previously explained, and can additionally include the biometric data 230 to identify a particular user associated with the signed control message 240. The computing device 150 can receive the signed control message 240 and verify the key used to sign the control message as well as the biometric data 230 in the signed control message 240.

In some cases, the biometric data 230 can be included in the signed control message 240, as previously noted. In other cases, the biometric data 230 can be sent by the XR system 100 to the computing device 150 in a separate message as the control message. For example, in some cases, the signed control message 240 can represent multiple messages, with one message including a control message signed with the key 206 and another message including the biometric data 230. The other message including the biometric data 230 can be signed with the key 206 or associated with the signed control message, or can otherwise be accepted by the computing device 150 without it being signed with the key 206.

In some examples, the computing device 150 can maintain biometric data of one or more users allowed to control the computing device 150. The computing device 150 can compare such biometric data with the biometric data 230 sent by the XR system 100 (e.g., in the signed control message 240), in order to verify/authorize the biometric data 230 from the XR system 100. For example, in some cases, a user or owner of the computing device 150 can limit control of the computing device 150 to certain users. The computing device 150 can obtain and store a biometric feature vector of each user allowed to control the computing device 150. When a nearby device wants to control the computing device 150, the nearby device can obtain a key as previously explained, and use the key to sign a control message to the computing device 150. The nearby device can send the signed control message to the computing device 150 along with a biometric feature vector obtained from a user (e.g., via biometric sensor 108).

The computing device 150 can verify the key used to sign the control message received from the nearby device, to ensure that the computing device 150 is authorized to control the computing device 150. In addition, the computing device 150 can compare the biometric feature vector from the nearby device with one or more biometric feature vectors stored at the computing device 150. If the biometric feature vector from the nearby device matches a biometric feature vector at the computing device 150 (e.g., corresponding to a user allowed to control the computing device 150), the computing device 150 can accept the control message/request. Otherwise, the computing device 150 can reject the control message/request to prevent an unauthorized user from controlling the computing device 150.

Figures 3A, 3B:
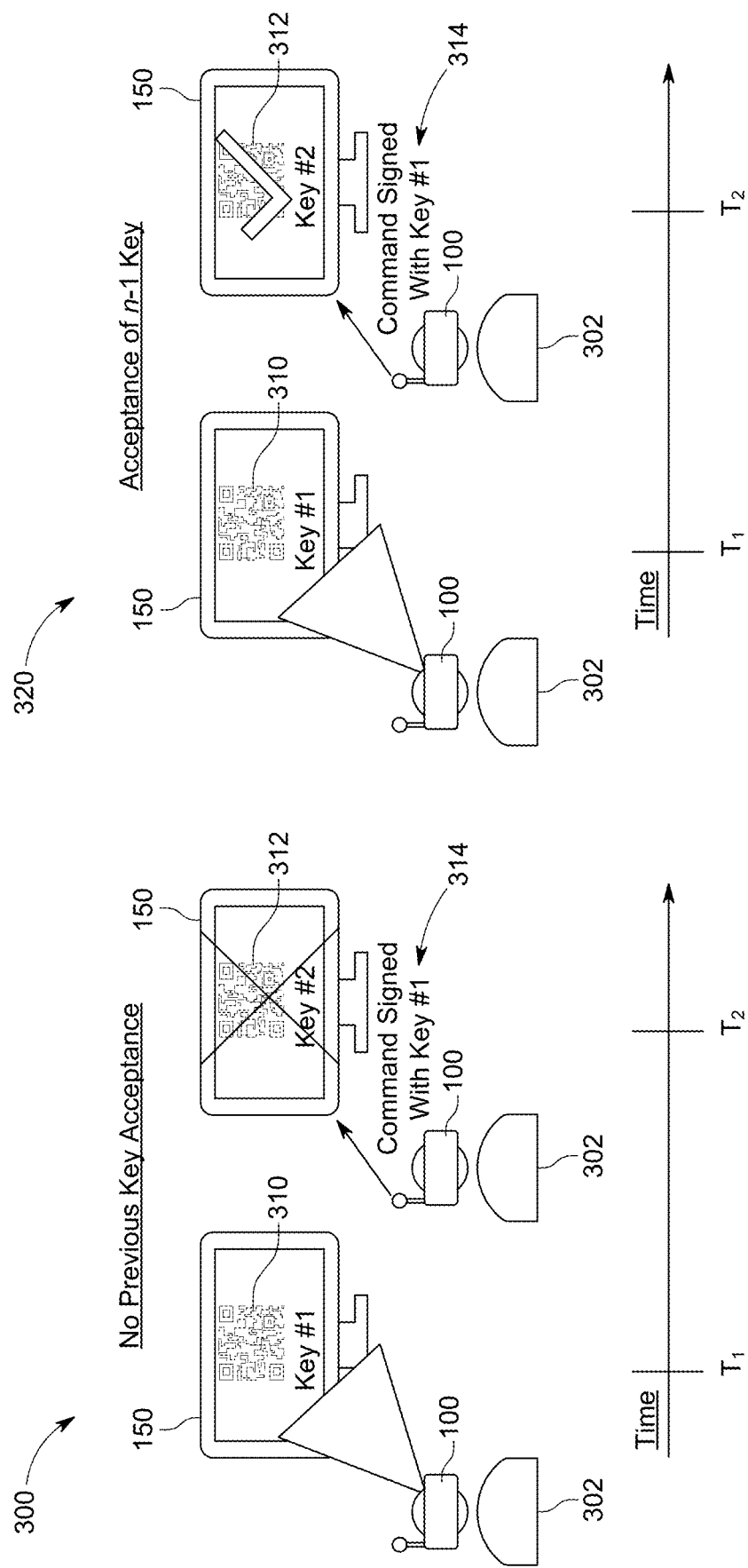
FIG. 3A illustrates an example race condition scenario where a computing device does not accept previous keys issued for controlling the computing device, in accordance with some examples of the present disclosure.
FIG. 3B illustrates an example scenario where a computing device is configured to accept a number of previous/preceding keys issued for controlling the computing device, in accordance with some examples of the present disclosure.

In some cases, to avoid race conditions, the computing device 150 can accept control messages (e.g., commands/instructions) signed by any of a certain number of preceding keys issued (e.g., relative to a last or most recent key issued) for controlling the computing device 150. For example, FIG. 3A illustrates an example race condition scenario 300 where the computing device 150 does not accept previous keys issued (e.g., keys that are older than a last or most recent key issued) for controlling the computing device 150. In this example, the computing device 150 displays a first key 310. The first key 310 can be displayed by the computing device 150 or encoded in a pattern or rendering displayed by the computing device 150.

At time $t_1$, the first key 310 (or a pattern or rendering encoding the key 310) displayed by the computing device 150 is within a field-of-view (FOV) of an image sensor(s) (e.g., image sensor 102A, image sensor 102B) of an XR system 100 worn by a user 302, the image sensor(s) can detect/capture the first key 310. The XR system 100 can detect/extract the first key 310 for use in controlling the computing device 150. At time $t_2$, the XR system 100 sends a signed command 314 to the computing device 150. The signed command 314 can include one or more commands/instructions for controlling an operation(s) and/or state(s) of the computing device 150. For example, the signed command 314 can include a command to change a power state of the computing device 150 or perform an operation such as, for example, changing a channel, changing a volume, etc.

The signed command 314 in this example is signed with the first key 310. However, when the computing device 150 receives the signed command 314, the computing device 150 has already generated a second key 312. This creates a race condition where the computing device 150 has generated a new key before it received the signed command 314 signed with the first key 310. If the computing device 150 does not accept any previous keys that are older than the latest/newest key (e.g., the second key 312), the computing device 150 will reject the signed command 314 from the XR system 100 because the signed command 314 is signed with the first key 310 rather than the second key 312. To avoid rejecting commands signed with otherwise valid keys because of race conditions as illustrated in FIG. 3A, the computing device 150 can be configured to accept the latest/newest key (e.g., the second key 312) and a number of previous/preceding keys.

FIG. 3B illustrates an example scenario 320 where the computing device 150 is configured to accept a number of previous/preceding keys issued for controlling the computing device 150. In this example, the computing device 150 is configured to accept n number of preceding keys displayed prior to the last/newest key (e.g., the second key 312). Here, the first key 310 displayed by the computing device 150 is within the n number of preceding keys accepted by the computing device 150. Thus, at time $t_2$, the XR system 100 can send the signed command 314 signed with the first key 310, and the computing device 150 can accept/approve the signed command 314 even though the signed command 314 was signed with an older key than the last/newest key (e.g., the second key 312).

When the computing device 150 receives the signed command 314, the computing device 150 can check if the signed command 314 was signed with the second key 312 or with any of then number of preceding keys allowed. The computing device 150 can determine that the signed command 314 was signed with the first key 310 and that the first key 310 is within the n number of preceding keys allowed. The computing device 150 can accept the signed command 314 despite the signed command 314 not being signed with the second key 312. The computing device 150 can then execute the instruction(s) in the signed command 314, enabling the XR system 100 to control the computing device 150 and avoid the race condition.

Figure 4:
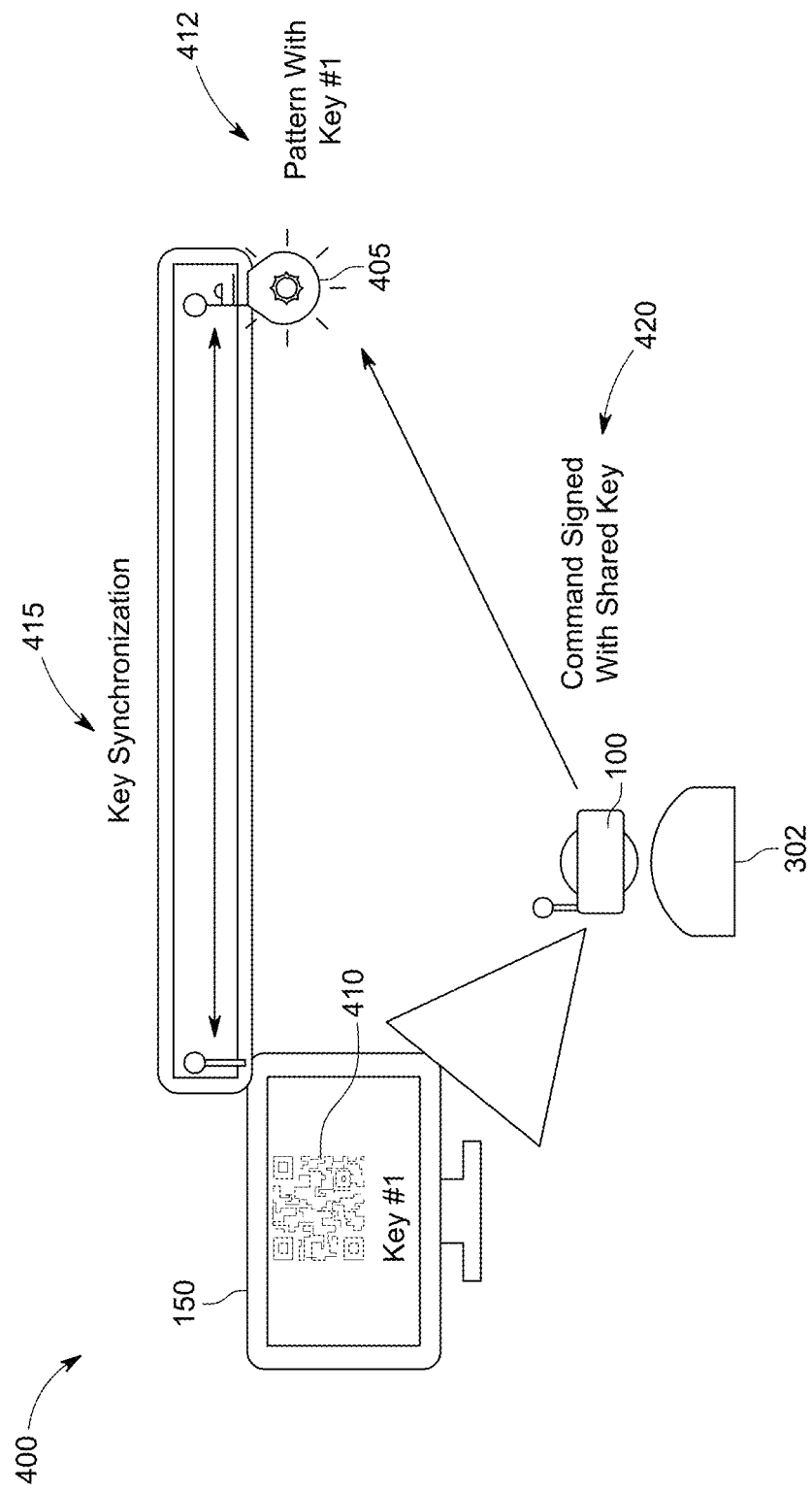
FIG. 4 is a diagram illustrating an example key sharing scenario where multiple computing devices share security data and/or a security data generator to grant nearby devices shared security data that the nearby device can use to control any of the multiple computing devices, in accordance with some examples of the present disclosure.

FIG. 4 is a diagram illustrating an example key sharing scenario 400 where multiple computing devices share security data (e.g., a key, a token, etc.) and/or a security data generator (e.g., a key generator, a token generator, etc.) to grant nearby devices (e.g., XR system 100) shared security data that the nearby device can use to control any of the multiple computing devices. In this example, the computing device 150 displays a content item 410 (e.g., a code, an image, a visual pattern, a string, a digital object, a graphic, a virtual item, a video, an animation, etc.) that encodes a key (and/or other security data) that a nearby device can use to control the computing device 150 and/or the computing device 405. The computing device 405 can be, for example, an IoT/smart device such as, for example and without limitation, a smart light, a smart hub, a smart sensor, a smart appliance, a television, an embedded system, a mobile computing device (e.g., a smartphone, a laptop computer, a tablet computer, etc.), a smart speaker, a smart camera, a smart lock, a smart switch, a smart security system, a video game console, a GPS device, and/or any other IoT/smart or connected device. In the example shown in FIG. 4, the computing device 405 is a smart bulb that can be controlled by the XR system 100 using the key encoded in the content item 410.

The computing device 405 also emits a pattern 412 that encodes the same key as the key encoded in the content item 410. For example, the computing device 405 can dim and brighten light levels emitted by the computing device 405 according to a pattern that encodes the key and can be detected and recognized by the XR system 100. The XR system 100 can extract the key from the content item 410 or the pattern 412, and use the key to sign commands to control the computing device 150 and/or the computing device 405. For example, in FIG. 4, the XR system 100 has detected the content item 410 displayed by the computing device 150 and extracted the key from the content item 410. The XR system 100 use the key to generate a signed command 420 to control the computing device 405, even though the key was not detected/extracted from the pattern 412 associated with the computing device 405. The XR system 100 can send the signed command 420 to the computing device 405, and the computing device 405 can verify the key used to sign the signed command 420. Upon verifying the key used to sign the signed command 420, the computing device 405 can accept and implement the command from the signed command 420.

In some examples, the XR system 100 can also use the key to sign a command to control the computing device 150. Moreover, the XR system 100 can similarly detect and extract the key from the pattern 412, and use that key to sign a command to control the computing device 150. The key encoded in the content item 410 and the pattern 412 can be a shared key used/accepted by both the computing device 150 and the computing device 405. In some examples, additional computing devices can share the key, allowing the XR system 100 to obtain the shared key from any of the computing devices to control any of the computing devices.

Thus, a group of computing devices (e.g., computing device 150, computing device 405, and any other computing device) can share a same key such that an electronic device (e.g., XR system 100) that extracts the key from one of the computing devices can use that key to control any of the other computing devices in the group. For example, if an image sensor on the XR system 100 has visibility to the content item 410 but does not have visibility to (or is not able to detect) the pattern from the computing device 405, the XR system 100 can simply extract the key from the content item 410 for use in controlling the computing device 405. Similarly, if an image sensor on the XR system 100 can detect the pattern 412 but does not have visibility to the content item 410 from the computing device 150, the XR system 100 can simply extract the key from the pattern 412 for use in controlling the computing device 150.

In some cases, the computing device 150 and the computing device 405 can share a same security data generator (e.g., security data generator 155), such as a key generator, in order to generate a shared security data such as a shared key(s), which can be used to control either device. In some examples, the computing device 150 and the computing device 405 can synchronize key changes (and/or other security data changes) over a network or a wireless connection. For example, in some cases where a key is generated with a number of rounds of a hashing function based on a string plus n where the string is a base key and n is an incrementing index as new keys are needed/generated, the computing device 150 and the computing device 405 can share the same base key string and perform a synchronization operation 415 (e.g., via wireless radio or any other communication scheme) to increment the respective value of n used for each key. In this way, the computing device 150 and the computing device 405 can maintain shared, synchronized keys that each device can encode in an output pattern. A nearby device(s) that detects the output pattern from any of the computing devices can extract the key encoded in the output pattern and use the key to sign a command(s) to control any of the computing devices.

Figure 5:
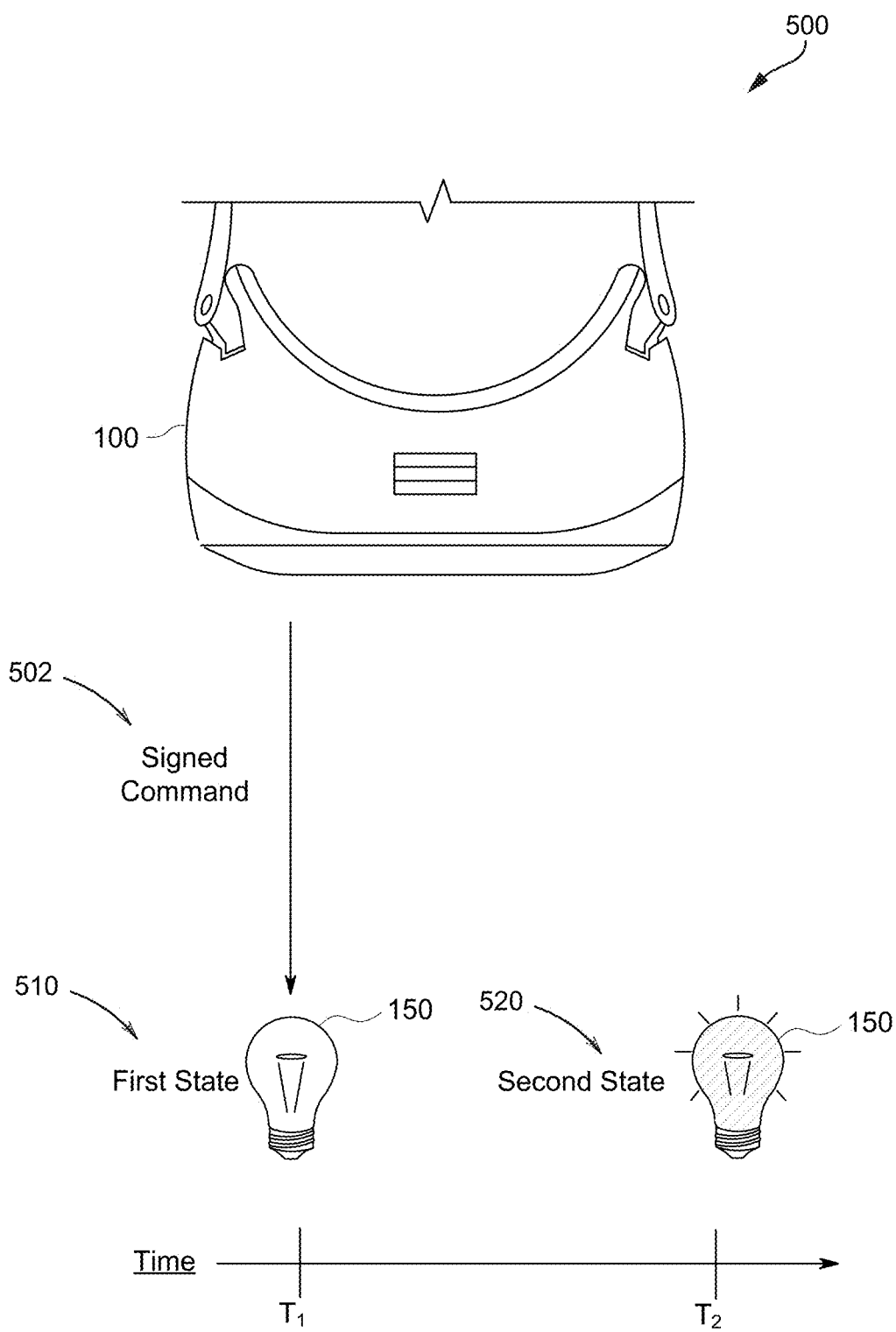
FIG. 5 is a diagram illustrating an example use case for controlling a computing device, in accordance with some examples of the present disclosure.

FIG. 5 is a diagram illustrating an example use case 500 for controlling the computing device 150. In this example, the computing device 150 represents a smart light bulb. The XR system 100 can obtain a key for controlling the computing device 150 as previously described. For example, the XR system 100 can detect a pattern emitted by the computing device 150 (or output by another computing device sharing a key with the computing device 150) which encodes a key. The pattern can include, for example, a dimming and brightening light pattern, a pattern of color temperature changes, and/or any other pattern. The XR system 100 can extract the key from the pattern and use the key to generate a signed command 502. The signed command 502 can include one or more commands signed with the key extracted from the pattern.

The XR system 100 can send the signed command 502 to the computing device 150. The computing device 150 is in a first state 510 when it receives the signed command 502 from the XR system 100. The computing device 150 can verify/validate the key used to sign the signed command 502 by identifying the key used to sign the signed command 502 and comparing the key with one or more valid keys at the computing device 150. If the computing device 150 is able to verify/validate the key, the computing device 150 can accept and execute the command in the signed command 502.

In this example, the signed command 502 includes a command to change a state of the computing device 150 from a first state 510 to a second state 520. The first state 510 illustrated in this example is an off state and the second state 520 illustrated in this example is an on state. Thus, as shown in FIG. 5, the XR system 100 can use the signed command 502 to turn on the smart light bulb represented by the computing device 150. In other examples, the signed command 502 can include a command to change an operation/state of the smart light bulb represented by the computing device 150 to any other state. For example, the signed command 502 can include a command to turn off the smart light bulb (from an on state), change a light level of the smart light bulb, change a color temperature of the smart light bulb, start/stop an audio playback (e.g., sound, music, etc.) if the smart light bulb has audio capabilities, trigger a communication and/or connection by the smart light bulb with another device(s), generate a particular light pattern(s), or implement any other state/operation or combination of states/operations.

The XR system 100 can similarly use a signed command to control a state/operation of any other type of computing device 150, such as for example, a smart speaker, a smart television, a smart lock, a smart refrigerator, a smart camera, a smart wearable device, a smart security system, a smart thermostat, a smart sensor, a smart fitness/health tracker, a smart hub, a smart switch (e.g., a smart light switch, etc.), a smart appliance, etc.

Using a key encoded in a pattern emitted by the computing device 150 (or another device sharing the key with the computing device 150), the computing device 150 can avoid granting permanent access to the XR system 100 (or any other device) or requiring a user to manually revoke control permissions/access to the XR system 100 (or any other device) previously granted. The computing device 150 can instead use the key system described herein to grant temporary/limited control of the computing device 150 to the XR system 100 (and/or other computing devices). For example, once the XR system 100 has used to signed command 502 to control the computing device 150 or the computing device 150 has issued a number of subsequent keys that render the key used for the signed command 502 obsolete/expired, the XR system 100 can be required to obtain a new key to control the computing device 150. The control permission/access of the XR system 100 can thus be seamlessly removed.

Figure 6A:
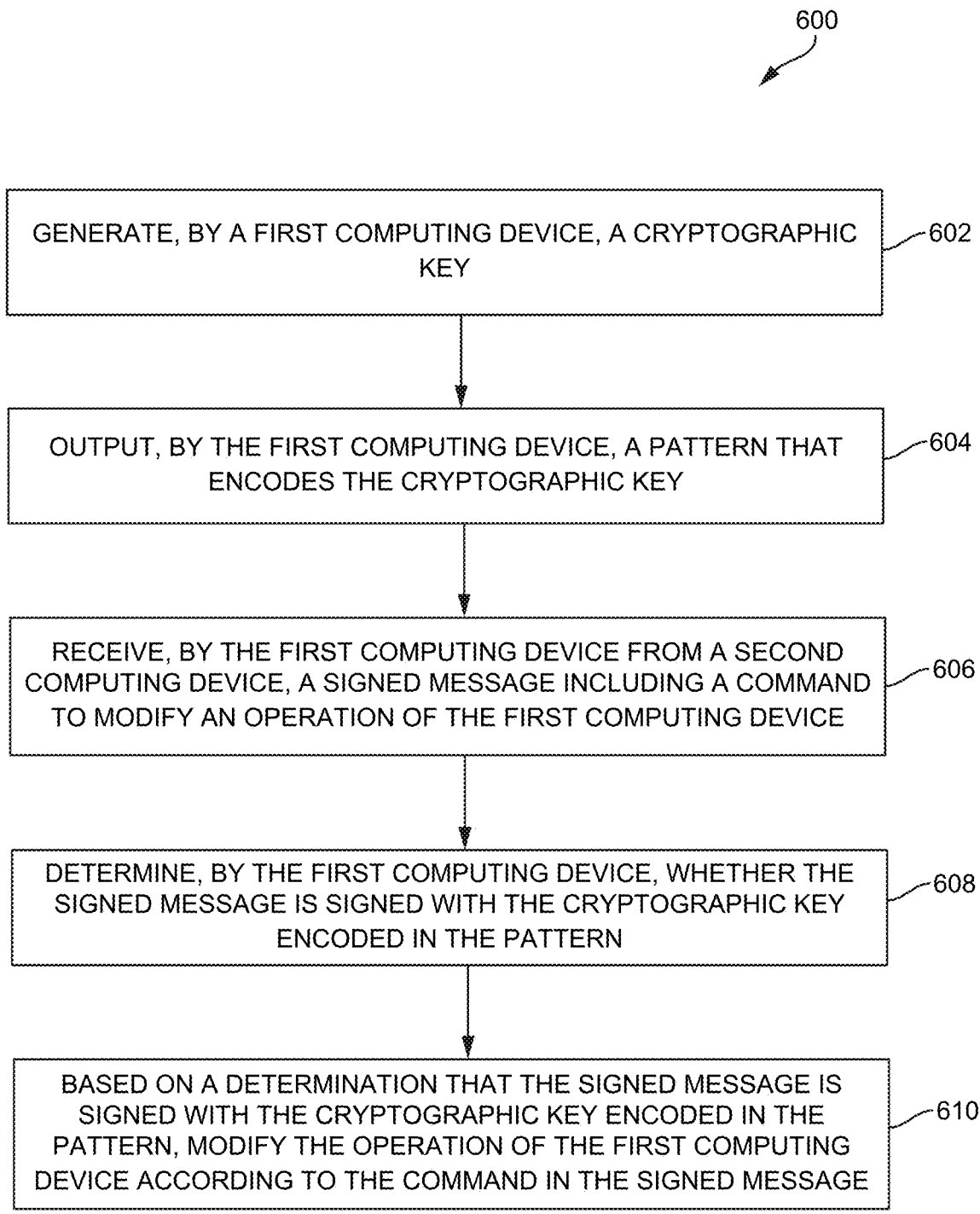
FIG. 6A is a flowchart illustrating an example process for granting an extended reality device permission to control a computing device, in accordance with some examples of the present disclosure.

FIG. 6A is a flowchart illustrating an example process 600 for granting an XR device (e.g., XR system 100) permission to control a computing device (e.g., computing device 150, computing device 405), such as an IoT or smart/connected device.

At block 602, the process 600 can include generating, by a first computing device (e.g., computing device 150), a cryptographic key (and/or any other security data). In some examples, the first computing device can use a security data generator (e.g., security data generator 155), such as a key generator, to generate a cryptographic key using one or more hashing functions and an input, such as an input string or phrase, for example.

At block 604, the process 600 can include outputting, by the first computing device, a pattern that encodes the cryptographic key (and/or any other security data). In some examples, the pattern can include a visual or display pattern, an audio pattern, a light pattern, any other pattern and/or combination thereof. For example, the pattern can include a pattern of light levels (e.g., a pattern of dimming and brightening light levels), a pattern of color temperature changes, a pattern of sound (e.g., noise, music, Morse code, a sequence of tones, etc.), a display pattern (e.g., an image, a QR code, a barcode, one or more displayed characters/symbols, a digital content item, a digital object, a video, virtual content, a digital rendering, a graphic, etc.), a combination thereof, etc.

At block 606, the process 600 can include receiving, by the first computing device from a second computing device (e.g., XR system 100), a signed message (e.g., signed control message 208, signed control message 240, signed command 314, signed command 420, signed command 502) including a command to modify an operation of the first computing device. The signed message can be signed by the second computing device using the cryptographic key encoded in the pattern (and/or any other security data encoded in the pattern). For example, the second computing device can extract a cryptographic key from the pattern and use the cryptographic key to sign a message including the command.

At block 608, the process 600 can include determining, by the first computing device, whether the signed message is signed with the cryptographic key encoded in the pattern (and/or any other security data encoded in the pattern). In some examples, the first computing device can compare a cryptographic key used to sign the signed message with one or more valid cryptographic keys at the first computing device. For example, the first computing device can compare a cryptographic key used to sign the signed message with a cryptographic key encoded by the first computing device into the pattern. In some examples, the first computing device can use a key at the first computing device to decode the signed message and validate the signed message.

At block 610, the process 600 can include, based on a determination that the signed message is signed with the cryptographic key encoded in the pattern (and/or any other security data encoded in the pattern), modifying, by the first computing device, the operation of the first computing device according to the command in the signed message. For example, the first computing device can validate the signed message and execute the command in the signed message to implement a particular operation/state associated with the command.

In some examples, the process 600 can include verifying, by the first computing device, that the signed message includes a biometric feature; and modifying the operation of the first computing device according to the command in the signed message based on the determination that the signed message is signed with the cryptographic key encoded in the pattern and based on verifying that the signed message includes the biometric feature.

In some examples, the process 600 can include verifying, by the first computing device, that the second computing device is connected to a same local network as the first computing device; and modifying the operation of the first computing device according to the command in the signed message based on the determination that the signed message is signed with the cryptographic key encoded in the pattern and based on verifying that the second computing device is connected to the same local network as the first computing device.

In some cases, the process 600 can include determining a number of cryptographic keys generated by the first computing device after the cryptographic key is below a threshold; based on determining that the number of cryptographic keys is below the threshold, determining that the cryptographic key has not expired; and based on determining that the cryptographic key has not expired, accepting, by the first computing device, the signed message signed with the cryptographic key.

In some cases, the process 600 can include receiving, by the first computing device from the second computing device, an additional message including one or more commands to modify one or more operations of the first computing device; determining, by the first computing device, that the additional message is missing a signature (e.g., was not signed with) associated with a valid cryptographic key generated by the first computing device; and based on determining that the additional message is missing the signature associated with the valid cryptographic key generated by the first computing device, rejecting the one or more commands to modify the one or more operations of the first computing device. In some examples, the first computing device is paired with the second computing device, and the first computing device rejects the one or more commands after the pairing of the first computing device and the second computing device based on determining that the additional message is missing the signature associated with the valid cryptographic key generated by the first computing device.

In some cases, the process 600 can include receiving, by the first computing device, an additional signed message including one or more commands to modify one or more operations of the first computing device; determining that the additional signed message was signed using a valid cryptographic key encoded in an additional pattern generated by a third computing device (e.g., computing device 405); and in response to determining that the additional signed message was signed using the valid cryptographic key encoded in the additional pattern generated by the third computing device, modifying the one or more operations of the first computing device according to the one or more commands in the additional signed message. In some cases, the process 600 can include determining that the valid cryptographic key is valid based on a determination that the valid cryptographic key is a matching copy of a particular cryptographic key at the apparatus. For example, the first computing device can determine that the valid cryptographic key is valid based on a match between the valid cryptographic key and a cryptographic key generated by and/or stored at the first computing device.

In some cases, the process 600 can include receiving, by the first computing device, an additional signed message including one or more commands to modify one or more operations of the first computing device; determining that the additional signed message was signed using a copy of a shared security data generator (e.g., security data generator 155), such as a shared key generator, used by the first computing device and a third computing device (e.g., computing device 405); and in response to determining that the additional signed message was signed using the copy of the shared security data generator used by the first computing device and the third computing device, modifying the one or more operations of the first computing device according to the one or more commands in the additional signed message.

Figure 6B:
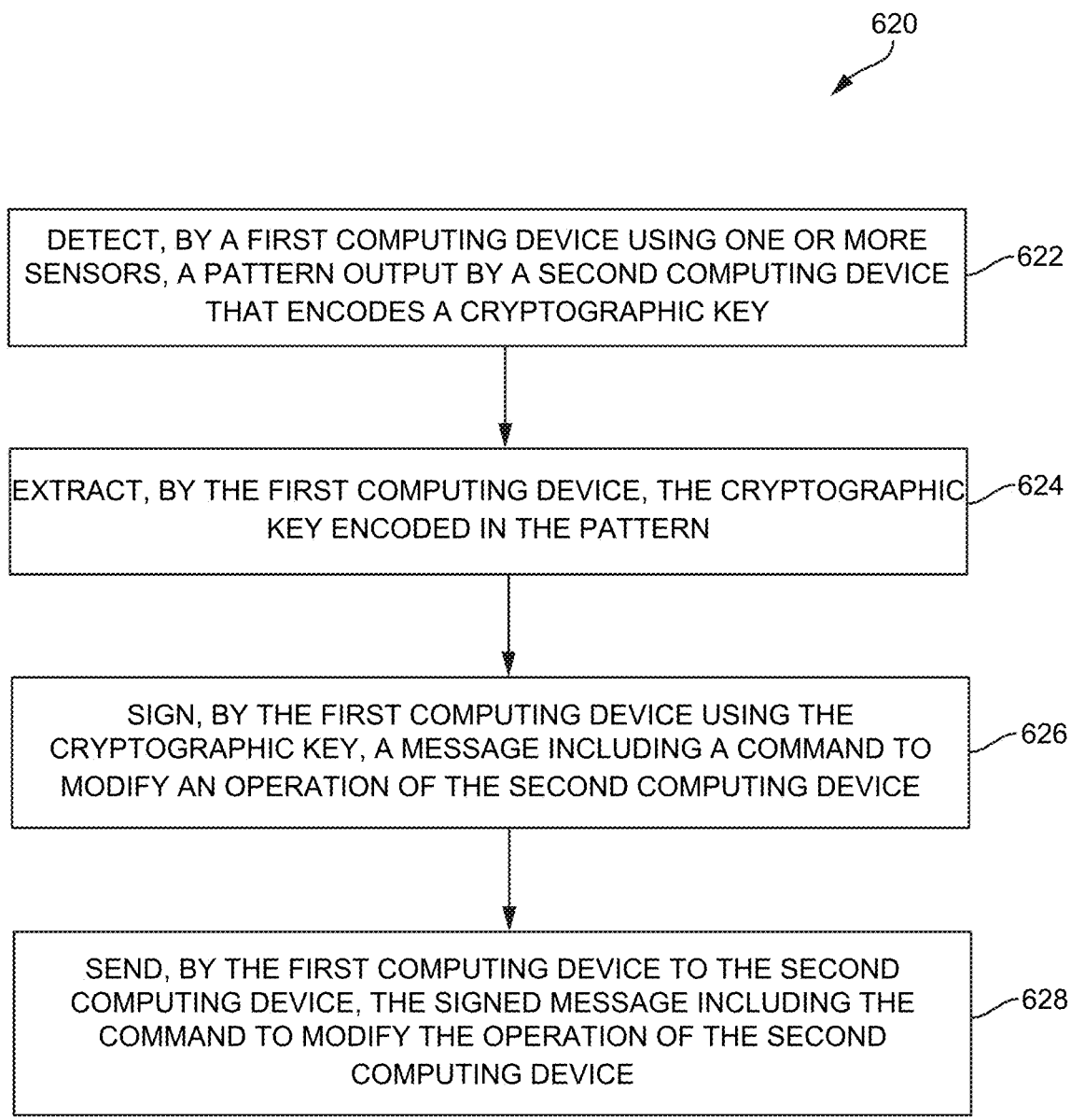
FIG. 6B is a flowchart illustrating an example process for using an extended reality device to control a computing device, in accordance with some examples of the present disclosure.

FIG. 6B is a flowchart illustrating an example process 620 for using an XR device (e.g., XR system 100) to control a computing device (e.g., computing device 150, computing device 405), such as an IoT/smart device.

At block 622, the process 620 can include detecting, by a first computing device (e.g., XR system 100) using one or more sensors of the first computing device, a pattern output by a second computing device (e.g., computing device 150).

The pattern can encode security data, such as a cryptographic key, a token, a random string and/or number, etc. In some examples, the pattern can include a visual/display pattern, an audio pattern, a light pattern, a combination thereof, and/or any other pattern. In some examples, the first computing device can use one or more image sensors to detect a visual/display pattern and/or any pattern of light. In some examples, the first computing device can use one or more audio sensors to detect any audio pattern.

At block 624, the process 620 can include extracting, by the first computing device, a cryptographic key encoded in the pattern (and/or any other security data encoded in the pattern). For example, the first computing device can analyze/decode the pattern to obtain the cryptographic key (and/or any other security data) encoded in the pattern.

At block 626, the process 620 can include signing, by the first computing device using the cryptographic key (and/or any other security data encoded in the pattern), a message including a command to modify an operation of the second computing device. In some cases, the first computing device can generate the command based on an event or trigger, such as a current state of the second computing device, an operation of the first computing device, content rendered by the first computing device, one or more conditions in an environment associated with the first computing device and/or the second computing device, a rule for controlling one or more computing devices, a time/date, an application running on the first computing device, etc. In some cases, the first computing device can generate the command based on a request or input from a user of the first computing device.

At block 628, the process 620 can include sending, by the first computing device to the second computing device, the signed message including the command to modify the operation of the second computing device. The second computing device can validate the signed message and execute the command, as previously described.

In some cases, the signed message can include a biometric feature(s). For example, the signed message can include a biometric feature vector obtained by a biometric sensor from a user. For example, the biometric feature vector can include biometric data associated with a user's fingerprint, eye, face, etc.

In some cases, the first computing device can send the signed message to the second computing device while the first computing device is connected to a same local network as the second computing device. The second computing device can verify that the first computing device is on the same local network as the second computing device as an additional security/authentication factor.

In some examples, the process 600 and/or the process 620 may be performed by one or more computing devices or apparatuses. In one illustrative example, the process 600 can be performed by the computing device 150 shown in FIG. 1, and the process 620 can be performed by the XR system 100 shown in FIG. 1. In some examples, the process 600 or the process 620 can be performed by one or more computing devices with the computing device architecture 700 shown in FIG. 7. In some cases, such a computing device or apparatus may include a processor, microprocessor, microcomputer, or other component of a device that is configured to carry out the steps of the process 600 or the process 620. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 and the process 620 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and the process 620 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
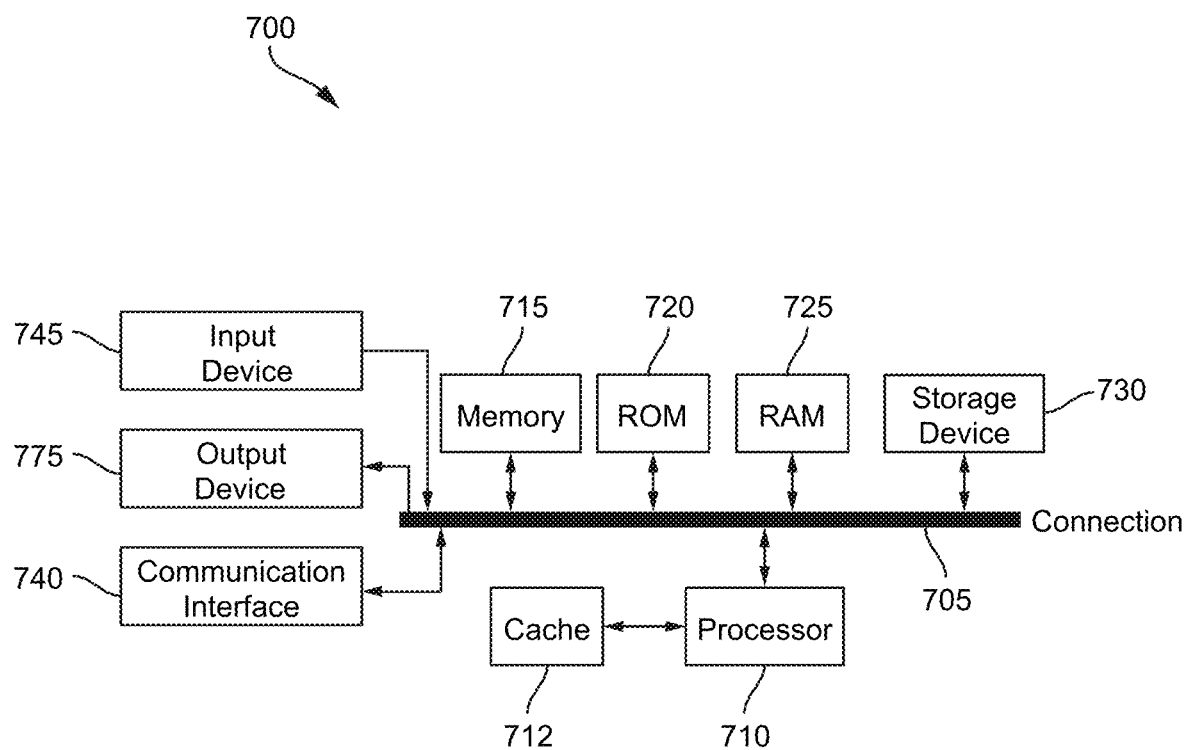
FIG. 7 illustrates an example computing device architecture, in accordance with some examples of the present disclosure.

FIG. 7 illustrates an example computing device architecture 700 of an example computing device which can implement various techniques described herein. For example, the computing device architecture 700 can implement at least some portions of the XR system 100 shown in FIG. 1 or the computing device 150 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics.

The processor 710 can include any general-purpose processor and a hardware or software service stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 775 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software, code, firmware, etc., for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 775, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for processing one or more messages, the apparatus comprising: memory; and one or more processors coupled to the memory, the one or more processors being configured to: generate a cryptographic key; output a pattern that encodes the cryptographic key, the pattern comprising at least one of a visual pattern, an audio pattern, and a light pattern; receive, from a computing device, a signed message comprising a command to modify an operation of the apparatus, determine whether the signed message is signed with the cryptographic key encoded in the pattern, and based on a determination that the signed message is signed with the cryptographic key encoded in the pattern, modify the operation of the apparatus according to the command in the signed message.

Aspect 2. The apparatus of Aspect 1, wherein the one or more processors are configured to: receive an additional signed message comprising one or more commands to modify one or more operations of the apparatus; determine that the additional signed message was signed using a valid cryptographic key encoded in an additional pattern generated by a different computing device: and in response to determining that the additional signed message was signed using the valid cryptographic key encoded in the additional pattern generated by the different computing device, modify the one or more operations of the apparatus according to the one or more commands in the additional signed message.

Aspect 3. The apparatus of Aspect 2, wherein the one or more processors are configured to: determine that the valid cryptographic key is valid based on a determination that the valid cryptographic key is a matching copy of a particular cryptographic key at the apparatus.

Aspect 4: The apparatus of any of Aspects 1 to 3, wherein the one or more processors are configured to: receive an additional signed message comprising one or more commands to modify one or more operations of the apparatus: determine that the additional signed message was signed using a copy of a shared key generator used by the apparatus and a different computing device: and n response to determining that the additional signed message was signed using the copy of the shared key generator used by the apparatus and the different computing device, modify, the one or more operations of the apparatus according to the one or more commands in the additional signed message.

Aspect 5: The apparatus of any of Aspects 1 to 4, wherein the one or more processors are configured to: verify that the signed message comprises a biometric feature: and modify the operation of the apparatus according to the command in the signed message based on the determination that the signed message is signed with the cryptographic key encoded in the pattern and based on verifying that the signed message comprises the biometric feature.

Aspect 6: The apparatus of any of Aspects 1 to 5, wherein the one or more processors are configured to: verify that the computing device is connected to a same local network as the apparatus; and modify the operation of the apparatus according to the command in the signed message based on the determination that the signed message is signed with the cryptographic key encoded in the pattern and based on verifying that the computing device is connected to the same local network as the apparatus.

Aspect 7: The apparatus of any of Aspects 1 to 6, wherein the one or more processors are configured to: determine a number of cryptographic keys generated by the apparatus after the cryptographic key is below a threshold: based on determining that the number of cryptographic keys is below the threshold, determine that the cryptographic key has not expired; and based on determining that the cryptographic key has not expired, accept the signed message signed with the cryptographic key.

Aspect 8: The apparatus of any of Aspects 1 to 7, wherein the one or more processors are configured to: receive, from the computing device, an additional message comprising one or more commands to modify one or more operations of the apparatus; determine that the additional message is missing a signature associated with a valid cryptographic key generated by the apparatus, and based on determining that the additional message is missing the signature associated with the valid cryptographic key generated by the apparatus, reject the one or more commands to modify the one or more operations of the apparatus.

Aspect 9: The apparatus of Aspect 8, wherein the apparatus is paired with the computing device, wherein the apparatus rejects the one or more commands after the pairing of the apparatus and the computing device based on determining that the additional message is missing the signature associated with the valid cryptographic key generated by the apparatus.

Aspect 10: The apparatus of any of Aspects 1 to 9, wherein the light pattern comprises at least one of a light dimming and brightening pattern and a pattern of color temperature changes.

Aspect 11: The apparatus of any of Aspects 1 to 10, wherein the visual pattern comprises at least one of a display pattern and a visual code.

Aspect 12: The apparatus of any of Aspects 1 to 11, wherein the apparatus comprises an Internet-of-Things (IoT) device.

Aspect 13: The apparatus of an of Aspects 1 to 12, wherein the apparatus comprises a smart home device and the computing device comprises an extended reality device.

Aspect 14: The apparatus of any of Aspects 1 to 13, further comprising at least one of a display, a speaker, a light-emitting device, a microphone, one or more sensors, and a camera.

Aspect 15: The apparatus of Aspect 14, wherein the one or more sensors comprise at least one of a light sensor, an audio sensor, a motion sensor, a temperature sensor, a humidity sensor, an image sensor, an accelerometer, a gyroscope, a pressure sensor, a touch sensor, and a magnetometer.

Aspect 16: A method of processing one or more messages, comprising: generating, by a first computing device, a cryptographic key; outputting, by the first computing device, a pattern that encodes the cryptographic key, the pattern comprising at least one of a visual pattern, an audio pattern, and a light pattern: receiving, from a second computing device, a signed message comprising a command to modify an operation of the first computing device; determining, by the first computing device, whether the signed message is signed with the cryptographic key encoded in the pattern; and based on a determination that the signed message is signed with the cryptographic key encoded in the pattern, modifying, by the first computing device, the operation of the first computing device according to the command in the signed message.

Aspect 17: The method of Aspect 16, further comprising, receiving an additional signed message comprising one or more commands to modify one or more operations of the first computing device: determining that the additional signed message was signed using a valid cryptographic key encoded in an additional pattern generated by a different computing device: and in response to determining that the additional signed message was signed using the valid cryptographic key encoded in the additional pattern generated by the different computing device, modifying the one or more operations of the first computing device according to the one or more commands in the additional signed message.

Aspect 18: The method of Aspect 17, further comprising: determining that the valid cryptographic key is valid based on a determination that the valid cryptographic key is a matching copy of a particular cryptographic key at the first computing device.

Aspect 19: The method of any of Aspects 16 to 18, further comprising: receiving an additional signed message comprising one or more commands to modify one or more operations of the first computing device: determining that the additional signed message was signed using a copy of a shared key generator used by the first computing device and a different computing device; and in response to determining that the additional signed message was signed using the copy of the shared key generator used by the first computing device and the different computing device, modifying the one or more operations of the first computing device according to the one or more commands in the additional signed message.

Aspect 20: The method of any of Aspects 16 to 19, further comprising: verifying that the signed message comprises a biometric feature; and modifying the operation of the first computing device according to the command in the signed message based on the determination that the signed message is signed with the cryptographic key encoded in the pattern and based on verifying that the signed message comprises the biometric feature.

Aspect 21: The method of any of Aspects 16 to 20, further comprising: verifying that the second computing device is connected to a same local network as the first computing device; and modifying the operation of the first computing device according to the command in the signed message based on the determination that the signed message is signed with the cryptographic key encoded in the pattern and based on verifying that the second computing device is connected to the same local network as the first computing device.

Aspect 22. The method of any of Aspects 16 to 21, further comprising determining a number of cryptographic keys generated by the first computing device after the cryptographic key is below a threshold, based on determining that the number of cryptographic keys is below the threshold, determining that the cryptographic key has not expired, and based on determining that the cryptographic key has not expired, accepting the signed message signed with the cryptographic key.

Aspect 23: The method of any of Aspects 16 to 22, further comprising receiving, from the second computing device, an additional message comprising one or more commands to modify one or more operations of the first computing device, determining that the additional message is missing a signature associated with a valid cryptographic key generated by the first computing device; and based on determining that the additional message is missing the signature associated with the valid cryptographic key generated by the first computing device, rejecting the one or more commands to modify the one or more operations of the first computing device.

Aspect 24: The method of Aspect 23, wherein the first computing device is paired with the second computing device, and further comprising: rejecting the one or more commands after the pairing of the first computing device and the second computing device based on determining that the additional message is missing the signature associated with the valid cryptographic key generated by the first computing device.

Aspect 25: The method of any of Aspects 16 to 24, wherein the light pattern comprises at least one of a light dimming and brightening pattern and a pattern of color temperature changes.

Aspect 26: The method of any of Aspects 16 to 25, wherein the visual pattern comprises at least one of a display pattern and a visual code.

Aspect 27: The method of any of Aspects 16 to 26, wherein the first computing device comprises an Internet-of-Things (IoT) device.

Aspect 28: The method of any of Aspects 16 to 27, wherein the first computing device comprises a smart home device and the second computing device comprises an extended reality device.

Aspect 29: A non-transitory computer-readable medium having stored thereon instructions that, when executed by one or more processors, cause the one or more processors to perform one or more of operations according to any of Aspects 1 to 28.

Aspect 30: An apparatus for processing one or more messages, comprising means for performing one or more of operations according to any of Aspects 1 to 28.

What is claimed is:

1. An Internet-of-Things (IoT) device for processing one or more messages, the IoT device comprising:
   memory; and
   one or more processors coupled to the memory, the one or more processors being configured to:
   generate a cryptographic key using a shared key generator used by the IoT device and at least one separate device to generate cryptographic keys usable by one or more computing devices to sign control command messages, wherein the signed control command messages are for controlling operations of the IoT device and the at least one separate device;
   communicate with the at least one separate device to synchronize the shared key generator to change from the cryptographic key to an updated cryptographic key for controlling operations of the IoT device and the at least one separate device;
   output a pattern that encodes the updated cryptographic key, the pattern comprising at least one of a visual pattern, an audio pattern, and a light pattern, the light pattern comprising at least one of a light dimming and brightening pattern and a pattern of color temperature changes;
   receive, from an extended reality (XR) device, a signed message comprising a command to modify an operation of the IoT device;
   determine whether the signed message is signed with the updated cryptographic key encoded in the pattern and generated using the shared key generator; and
   based on a determination that the signed message is signed with the updated cryptographic key encoded in the pattern and generated using the shared key generator, perform the command to modify the operation of the IoT device.

2. The IoT device of claim 1, wherein the one or more processors are configured to:
receive an additional signed message comprising one or more commands to modify one or more operations of the IoT device;
determine that the additional signed message was signed using a valid cryptographic key encoded in an additional pattern generated by a different XR device; and
in response to determining that the additional signed message was signed using the valid cryptographic key encoded in the additional pattern generated by the different XR device, perform the one or more commands to modify the one or more operations of the IoT device.

3. The IoT device of claim 2, wherein the one or more processors are configured to:
determine that the valid cryptographic key is valid based on a determination that the valid cryptographic key is a matching copy of a particular cryptographic key at the IoT device.

4. The IoT device of claim 1, wherein the one or more processors are configured to:
verify that the signed message comprises a biometric feature; and
perform the command to modify the operation of the IoT device based on the determination that the signed message is signed with the updated cryptographic key encoded in the pattern and based on verifying that the signed message comprises the biometric feature.

5. The IoT device of claim 1, wherein the one or more processors are configured to:
verify that the XR device is connected to a same local network as the IoT device; and
perform the command to modify the operation of the IoT device based on the determination that the signed message is signed with the updated cryptographic key encoded in the pattern and based on verifying that the XR device is connected to the same local network as the IoT device.

6. The IoT device of claim 1, wherein the one or more processors are configured to:
determine a number of cryptographic keys, generated by the IoT device after the cryptographic key, is below a threshold number of cryptographic keys;
based on determining that the number of cryptographic keys is below the threshold number of cryptographic keys, determine that the updated cryptographic key has not expired despite a presence of a new cryptographic key that is latest in time relative to the cryptographic key; and
based on determining that the updated cryptographic key has not expired, accept the signed message signed with the updated cryptographic key to modify the operation of the IoT device.

7. The IoT device of claim 1, wherein the one or more processors are configured to:
receive, from the XR device, an additional message comprising one or more commands to modify one or more operations of the IoT device;
determine that the additional message is missing a signature associated with a valid cryptographic key generated by the IoT device; and
based on determining that the additional message is missing the signature associated with the valid cryptographic key generated by the IoT device, reject the one or more commands to modify the one or more operations of the IoT device.

8. The IoT device of claim 7, wherein the IoT device is paired with the XR device, wherein the IoT device is configured to reject the one or more commands after the pairing of the IoT device and the XR device based on determining that the additional message is missing the signature associated with the valid cryptographic key generated by the IoT device.

9. The IoT device of claim 1, wherein the visual pattern comprises at least one of a display pattern and a visual code.

10. The IoT device of claim 1, wherein the IoT device comprises a smart device.

11. The IoT device of claim 1, further comprising at least one of a display, a speaker, a light-emitting device, a microphone, one or more sensors, and a camera.

12. The IoT device of claim 11, wherein the one or more sensors comprise at least one of a light sensor, an audio sensor, a motion sensor, a temperature sensor, a humidity sensor, an image sensor, an accelerometer, a gyroscope, a pressure sensor, a touch sensor, and a magnetometer.

13. A method of processing one or more messages, comprising:
generating, by an Internet-of-Things (IoT) device, a cryptographic key using a shared key generator used by the IoT device and at least one separate device to generate cryptographic keys usable by one or more computing devices to sign control command messages, wherein the signed control command messages are for controlling operations of the IoT device and the at least one separate device;
communicating with the at least one separate device to synchronize the shared key generator to change from the cryptographic key to an updated cryptographic key for controlling operations of the IoT device and the at least one separate device;
outputting, by the IoT device, a pattern that encodes the updated cryptographic key, the pattern comprising at least one of a visual pattern, an audio pattern, and a light pattern, the light pattern comprising at least one of a light dimming and brightening pattern and a pattern of color temperature changes;
receiving, from an extended reality (XR), a signed message comprising a command to modify an operation of the IoT device;
determining, by the IoT device, whether the signed message is signed with the updated cryptographic key encoded in the pattern and generated using the shared key generator; and
based on a determination that the signed message is signed with the updated cryptographic key encoded in the pattern and generated using the shared key generator, performing, by the IoT device, the command to modify the operation of the IoT device.

14. The method of claim 13, further comprising:
receiving an additional signed message comprising one or more commands to modify one or more operations of the IoT device; determining that the additional signed message was signed using a valid cryptographic key encoded in an additional pattern generated by a different computing device; and
in response to determining that the additional signed message was signed using the valid cryptographic key encoded in the additional pattern generated by the different computing device, performing the one or more commands to modify the one or more operations of the IoT device.

15. The method of claim 14, further comprising:
determining that the valid cryptographic key is valid based on a determination that the valid cryptographic key is a matching copy of a particular cryptographic key at the IoT device.

16. The method of claim 13, further comprising:
verifying that the signed message comprises a biometric feature; and
performing the command to modify the operation of the IoT device based on the determination that the signed message is signed with the updated cryptographic key encoded in the pattern and based on verifying that the signed message comprises the biometric feature.

17. The method of claim 13, further comprising:
verifying that the XR device is connected to a same local network as the IoT device; and
performing the command to modify the operation of the IoT device based on the determination that the signed message is signed with the updated cryptographic key encoded in the pattern and based on verifying that the XR device is connected to the same local network as the IoT device.

18. The method of claim 13, further comprising:
determining a number of cryptographic keys generated by the IoT device after the cryptographic key is below a threshold;
based on determining that the number of cryptographic keys is below the threshold, determining that the cryptographic key has not expired; and
based on determining that the cryptographic key has not expired, accepting the signed message signed with the cryptographic key.

19. The method of claim 13, further comprising:
receiving, from the XR device, an additional message comprising one or more commands to modify one or more operations of the IoT device;
determining that the additional message is missing a signature associated with a valid cryptographic key generated by the IoT device; and
based on determining that the additional message is missing the signature associated with the valid cryptographic key generated by the IoT device, rejecting the one or more commands to modify the one or more operations of the IoT device.

20. The method of claim 19, wherein the IoT device is paired with the XR device, and further comprising:
rejecting the one or more commands after the pairing of the IoT device and the XR device based on determining that the additional message is missing the signature associated with the valid cryptographic key generated by the IoT device.

21. The method of claim 13, wherein the visual pattern comprises at least one of a display pattern and a visual code.

22. The method of claim 13, wherein the IoT device comprises a smart home device.

23. A non-transitory computer-readable medium of an Internet-of-Things (IoT) device having stored thereon instructions that, when executed by one or more processors, cause the one or more processors to:
generate a cryptographic key using a shared key generator used by the IoT device and at least one separate device to generate cryptographic keys usable by one or more computing devices to sign control command messages, wherein the signed control command messages are for controlling operations of the first computing IoT device and the at least one separate device;
communicate with the at least one separate device to synchronize the shared key generator to change from the cryptographic key to an updated cryptographic key for controlling operations of the IoT device and the at least one separate device;
output a pattern that encodes the updated cryptographic key, the pattern comprising at least one of a visual pattern, an audio pattern, and a light pattern, the light pattern comprising at least one of a light dimming and brightening pattern and a pattern of color temperature changes;
receive, from an extended reality (XR), a signed message comprising a command to modify an operation of the first computing IoT device;
determine whether the signed message is signed with the updated cryptographic key encoded in the pattern and generated using the shared key generator; and
based on a determination that the signed message is signed with the updated cryptographic key encoded in the pattern and generated using the shared key generator, perform the command to modify the operation of the IoT device.

24. The non-transitory computer-readable medium of claim 23, wherein the instructions, when executed by the one or more processors, cause the one or more processors to:
receive an additional signed message comprising one or more commands to modify one or more operations of the IoT device;
determine that the additional signed message was signed using a valid cryptographic key encoded in an additional pattern generated by a different computing device; and
in response to determining that the additional signed message was signed using the valid cryptographic key encoded in the additional pattern generated by the different computing device, perform the one or more commands to modify the one or more operations of the IoT device.

25. An Internet-of-Things (IoT) device for processing one or more messages, the IoT device comprising:
memory; and
one or more processors coupled to the memory, the one or more processors being configured to:
generate a cryptographic key using a shared key generator used by the IoT device and at least one separate device to generate cryptographic keys usable by one or more computing devices to sign control command messages, wherein the signed control command messages are for controlling operations of the IoT device and the at least one separate device;
communicate with the at least one separate device to synchronize the shared key generator to change from the cryptographic key to an updated cryptographic key for controlling operations of the IoT device and the at least one separate device;
output a pattern that encodes the updated cryptographic key, the pattern comprising at least one of a visual pattern, an audio pattern, and a light pattern, the light pattern comprising at least one of a light dimming and brightening pattern and a pattern of color temperature changes;
receive, from extended reality head mounted display (XR HMD) device, a message comprising a command to modify an operation of the IoT device;

determine whether the message is signed with the updated cryptographic key encoded in the pattern and generated using the shared key generator;

determine a number of cryptographic keys, generated by the IoT device after the cryptographic key, is below a threshold number of cryptographic keys;

determine if a second cryptographic key is generated, wherein the second cryptographic key is latest in time relative to the cryptographic key;

based on determining that the number of cryptographic keys is below the threshold number of cryptographic keys, determine that the updated cryptographic key has not expired despite a presence of the second cryptographic key; and based on determining that the updated cryptographic key has not expired, perform the command to modify the operation of the IoT device.

* * * * *